(12) United States Patent
Takahashi et al.

(10) Patent No.: US 12,036,747 B2
(45) Date of Patent: Jul. 16, 2024

(54) LAMINATE, METHOD FOR MANUFACTURING LAMINATE, AND SHAPE CONTROL DEVICE

(71) Applicant: NIPPON TELEGRAPH AND TELEPHONE CORPORATION, Tokyo (JP)

(72) Inventors: Riku Takahashi, Musashino (JP); Aya Tanaka, Musashino (JP); Yuko Ueno, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 463 days.

(21) Appl. No.: 17/282,922

(22) PCT Filed: Oct. 2, 2019

(86) PCT No.: PCT/JP2019/038956
§ 371 (c)(1),
(2) Date: Apr. 5, 2021

(87) PCT Pub. No.: WO2020/080113
PCT Pub. Date: Apr. 23, 2020

(65) Prior Publication Data
US 2021/0387425 A1 Dec. 16, 2021

(30) Foreign Application Priority Data
Oct. 18, 2018 (JP) .................. 2018-196996

(51) Int. Cl.
| | |
|---|---|
| C09J 4/06 | (2006.01) |
| B29C 65/00 | (2006.01) |
| B29C 65/48 | (2006.01) |
| B29C 65/52 | (2006.01) |
| C09J 5/02 | (2006.01) |
| B29K 33/00 | (2006.01) |
| B29K 105/00 | (2006.01) |

(52) U.S. Cl.
CPC ...... *B29C 65/4845* (2013.01); *B29C 65/4895* (2013.01); *B29C 65/521* (2013.01); *B29C 66/7465* (2013.01); *C09J 4/06* (2013.01); *B29K 2033/26* (2013.01); *B29K 2105/0002* (2013.01); *B29K 2105/0061* (2013.01); *C09J 5/02* (2013.01)

(58) Field of Classification Search
None
See application file for complete search history.

(56) References Cited

U.S. PATENT DOCUMENTS

| | | | |
|---|---|---|---|
| 2015/0093823 A1* | 4/2015 | Sutton | C12M 35/04 |
| | | | 435/375 |
| 2015/0320915 A1* | 11/2015 | Schmidt | C08J 3/075 |
| | | | 514/779 |
| 2018/0104940 A1 | 4/2018 | Sumaru et al. | |
| 2021/0069388 A1* | 3/2021 | Schmidt | C08J 3/075 |

FOREIGN PATENT DOCUMENTS

| | | |
|---|---|---|
| JP | 2009051211 A | 3/2009 |
| JP | 2018148918 A | 9/2018 |

OTHER PUBLICATIONS

Yousuke Watanabe and Hidemitsu Furukawa, Development of 3D printers and 3D scanners for gel materials, Journal of the Japan Society of Mechanical Engineers, vol. 116, No. 1138, 2013.
Sungmin Hong et al., 3D Printing of Highly Stretchable and Tough Hydrogels into Complex, Cellularized Structures, Advanced Materials, vol. 27, Issue 27, 2015, pp. 4035-4040.
Mitsuo Okano and Takao Aoyagi, on-off emission control system, New drug delivery system, Jan. 31, 2000, pp. 175-189.

* cited by examiner

*Primary Examiner* — Sheeba Ahmed
(74) *Attorney, Agent, or Firm* — Harness, Dickey & Pierce, P.L.C.

(57) ABSTRACT

A laminate including a base member, and a hydrogel layer whose forming material is a hydrogel, the hydrogel layer being provided on a surface of the base member. An adhesive region and a non-adhesive region are formed at an interface between the base member and the hydrogel layer, the adhesive region being a region where the base member and the hydrogel layer adhere to each other, the non-adhesive region being a region where the base member and the hydrogel layer do not adhere to each other.

19 Claims, 17 Drawing Sheets

LAMINATE, METHOD FOR MANUFACTURING LAMINATE, AND SHAPE CONTROL DEVICE

CROSS-REFERENCE TO RELATED APPLICATIONS

This application is a 371 U.S. National Phase of International Application No. PCT/JP2019/038956 filed on Oct. 2, 2019, which claims priority to Japanese Application No. 2018-196996 filed on Oct. 18, 2018. The entire disclosures of the above applications are incorporated herein by reference.

TECHNICAL FIELD

The present disclosure relates to a laminate, a method of producing a laminate, and a shape control device.

BACKGROUND ART

A hydrogel is a swollen substance containing a polymeric material having a three-dimensional network structure and containing a solvent in a large portion of the volume. A representative solvent contained in the hydrogel is water. Hydrogels are known to have properties such as low friction coefficient, high flexibility, and permeability through internally contained solvent.

The above-mentioned properties of hydrogels are similar to those of biological tissues. Therefore, hydrogels are attracting attention as a material with high affinity for living organisms. If the hydrogel can be processed into a three-dimensional shape similar to a biological tissue or a structure whose shape dynamically changes in response to an external stimulus, application and development can be expected in a wide range of fields of medical care, cell culture, and robotic engineering.

Note that examples of the "three-dimensional shape similar to a biological tissue" include a curved shape and a hollow channel shape such as that of a blood vessel. In addition, examples of the "structure whose shape dynamically changes in response to an external stimulus" include a structure whose shape changes in accordance with changes in water content and/or permeation pressure.

In recent years, molding techniques in which 3D printing techniques are applied to hydrogels have been proposed (see, for example, Non Patent Literatures 1 and 2). In the methods described in Non Patent Literatures 1 and 2, a structure having a complex three-dimensional shape, such as a hollow shape or a channel structure, can be produced using a hydrogel as a forming material.

CITATION LIST

Non Patent Literature

Non Patent Literature 1: The Japan Society of Mechanical Engineers, Vol. 116, 2013, No. 1138
Non Patent Literature 2: S. Hong, et al. Advanced Materials, 27, 4035-4040, 2015

SUMMARY OF THE INVENTION

Technical Problem

As described above, application and development of structures formed of a hydrogel in a wide range of fields are expected. Therefore, in addition to the methods described in Non Patent Literatures 1 and 2 described above, there has been a demand for a novel structure formed of a hydrogel whose shape is easy to control, and a method of producing such a structure.

In view of the foregoing, an advantage of some aspects of the disclosure is to provide a novel structure whose shape is easy to control. In addition, another advantage of some aspects of the disclosure is to provide a producing method of easily producing the structure. In addition, another advantage of some aspects of the disclosure is to provide a shape control device that includes the structure and can easily control the shape.

Means for Solving the Problem

In order to solve the problems described above, one aspect of the present disclosure provides a laminate including a base member, and a hydrogel layer whose forming material is a hydrogel, the hydrogel layer being provided on a surface of the base member, wherein an adhesive region and a non-adhesive region are formed at an interface between the base member and the hydrogel layer, the adhesive region being a region where the base member and the hydrogel layer adhere to each other, the non-adhesive region being a region where the base member and the hydrogel layer do not adhere to each other.

In one aspect of the present disclosure, the non-adhesive region may be provided in a band shape on the surface, and the adhesive region may be provided on both sides of an extending direction of the non-adhesive region.

In one aspect of the present disclosure, the forming material of the hydrogel layer may be a stimuli-responsive hydrogel.

One aspect of the present disclosure provides a method of producing a laminate, the method including forming a pattern of an adhesive functional group on a surface of a base member, applying a precursor solution including a precursor of a hydrogel to cover the pattern of the adhesive functional group, and polymerizing the precursor. The precursor includes a functional group that is polymerizable with the adhesive functional group.

One aspect of the present disclosure provides a method of producing a laminate, the method including forming a layer of a polymerization initiator on a surface of a base member, applying a precursor solution including a precursor of a hydrogel to cover the layer, and polymerizing the precursor by causing the polymerization initiator to react in a predetermined pattern shape.

One aspect of the present disclosure provides a method of producing a laminate, the method including forming a pattern of a gel intrusive polymer on a surface of a base member, and bringing a sheet member whose forming material is a hydrogel into contact with the gel intrusive polymer by disposing the sheet member to cover the pattern.

One aspect of the present disclosure provides a shape control device including the laminate, and an input unit configured to input, to the hydrogel layer, a stimulus that causes the stimuli-responsive hydrogel to react.

Effects of the Invention

According to the present disclosure, a novel structure whose shape is easy to control can be provided. In addition, a producing method of easily producing the structure can be provided. In addition, a shape control device that includes the structure and can easily control the shape can be provided.

DESCRIPTION OF EMBODIMENTS

Figure 1:
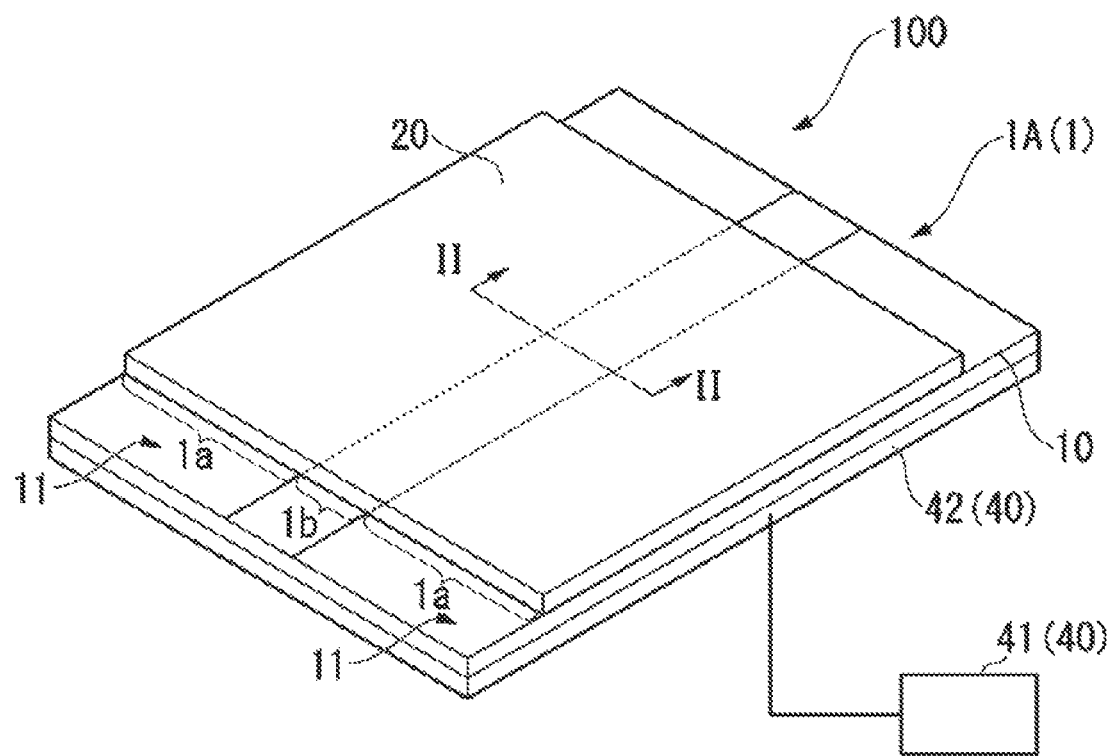
FIG. 1 is a schematic perspective view of a laminate 1 and a shape control device 100.

A laminate, a method of producing a laminate, and a shape control device according to the present embodiment will be described below with reference to FIGS. 1 to 18. Note that, in the drawings below, the dimensions, ratios, and the like of the components are appropriately changed for the sake of clarity of the drawings.

FIGS. 1 to 4 are explanatory diagrams illustrating a laminate 1 and a shape control device 100 according to the present embodiment.

Figure 2:
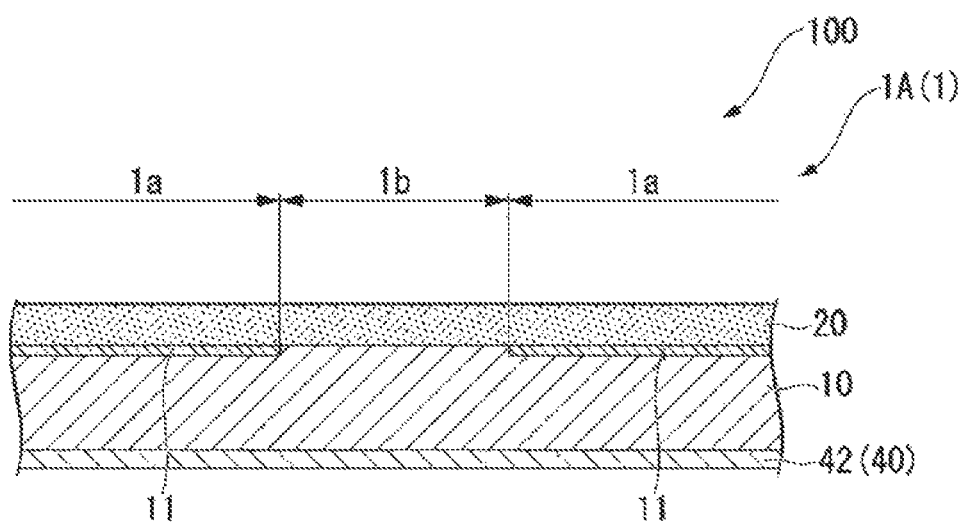
FIG. 2 is a cross-sectional view taken along a line II-II of FIG. 1.

FIG. 1 is a schematic perspective view of the laminate 1 and the shape control device 100 of the present embodiment, and FIG. 2 is a cross-sectional view taken along a line II-II of FIG. 1.

As illustrated in FIGS. 1 and 2, the laminate 1 includes a base member 10 and a hydrogel layer 20. In addition, the shape control device 100 includes the laminate 1 and an input unit 40 that inputs a stimulus to the hydrogel layer 20 of the laminate 1.

Descriptions will be sequentially made below.

Laminate and Shape Control Device

Base Member

The base member 10 supports the hydrogel layer 20. The shear modulus of the base member 10 is different from the shear modulus of the hydrogel layer 20. For example, the shear modulus of the base member 10 is higher than the shear modulus of the hydrogel layer 20.

As the forming material of the base member 10, various materials may be selected regardless of whether the material is organic or inorganic as long as the effect of the present disclosure is not impaired. The base member 10 may be or may not be optically transparent.

Examples of the organic material as the forming material of the base member 10 include polymeric materials and elastomers. Examples of the polymeric material include thermoplastic resins such as polyvinyl chloride, polystyrene, ABS resins, and polylactic acid, and thermosetting resins such as polyimide or phenolic resins.

Examples of the elastomer include polysilicone and synthetic rubber. The base member 10 formed of elastomer easily deform in accordance with stress. In the laminate 1 having the base member 10 as described above, the hydrogel layer 20 can be deformed in accordance with deformation of the base member 10.

As the forming material of the base member 10, a hydrogel whose degree of swelling is different from that of the hydrogel of the hydrogel layer 20 described later may be used.

The above-described organic material may contain various additives to additionally provide the base member 10 with various functions based on the physical properties of the additives. For example, the organic material may contain carbon nanotubes, gold nanostructures, porphyrin derivatives, polydopamine, indocyanine green, and the like such that the base member 10 generates heat in response to light reception.

Examples of the inorganic material as the forming material of the base member 10 include glass having excellent chemical stability and transparency, a conductor that generates heat in response to energization, a magnetic metal body that generates heat in response to a stimulus from a magnetic field, a piezoelectric element that generates electric power in response to a stress, and a light emitting element that emits light in response to energization. Examples of the light emitting element include a light-emitting diode.

Various processes may be provided to at least one of the surface or the interior of the base member 10 by known fine processing techniques. For example, the base member 10 may have an irregularity and/or a groove on the surface thereof Hydrogel Layer The hydrogel layer 20 is formed of a hydrogel and is provided on a surface of the base member 10.

Examples of the polymeric material constituting the hydrogel include water-soluble polymers such as polyacrylamide and polyvinyl alcohol, polysaccharides such as chitosan and alginic acid, and proteins such as collagen and albumin. These materials have a three-dimensional network structure and swell when solvents are applied in a large portion of their volume. A representative of such a solvent for the swelling of the polymeric material constituting the hydrogel swells is water.

In addition, a stimuli-responsive polymeric material may be used as the polymeric material constituting the hydrogel. Here, "stimuli-responsive" refers to a property that the polymeric material constituting the hydrogel changes the molecular structure in response to a stimulus such as heat, light, electricity and pH. With the stimulus that changes the molecular structure, the three-dimensional network structure of the polymeric material constituting the stimuli-responsive hydrogel changes and the degree of swelling changes. In the following description, a hydrogel containing a stimuli-responsive polymeric material may be referred to as "stimuli-responsive hydrogel".

Examples of the stimuli-responsive polymeric material include the following materials. Examples of a polymeric material that responds to a thermal stimulus include poly (N-isopropylacrylamide) and poly (methyl vinyl ether).

Examples of a polymeric material that responds to pH include polymer electrolytes obtained by polymerizing an anionic monomer or a cationic monomer. The anionic monomer and the cationic monomer correspond to the precursor in the present disclosure.

Examples of a polymeric material that responds to light include a polymeric material having spiropyran or azobenzene in the molecular skeleton.

Examples of a polymeric material that responds to electrical stimulus include polypyrrole, polythiophene, and polyaniline.

In addition, the forming material of the hydrogel layer 20 may be a hydrogel that is obtained by mixing a plurality of the above-described polymeric materials and responds to multiple stimuli. Further, a toughened hydrogel such as a double network gel, a slide ring gel, a Tetra-PEG gel and a nanoclay gel may be used as the forming material of the hydrogel layer 20.

Various known methods may be employed for the method of synthesizing the polymeric material constituting the hydrogel. For example, when the polymeric material constituting the hydrogel is an acrylic polymeric material, the acrylic groups may be cross-linked during polymerization of the acrylic monomer to form the three-dimensional network structure. The acrylic monomer corresponds to the precursor in the present disclosure.

The type of polymerization reaction during polymerization of the acrylic monomer is not particularly limited, but may be, for example, radical polymerization using a water-soluble photopolymerization initiator. Examples of the water-soluble photoinitiator include 2-oxoglutaric acid, 4-(2-hydroxyethoxy)-2-hydroxy-2-methylpropiophenone (product name: Irgacure 2959), phenyl (2,4,6-trimethylbenzoyl) lithium phosphinate (abbreviated as: LAP), and 2,2-azobis [2-methyl-N-(2-hydroxyethyl) propionamide] (product name: VA-086).

During radical polymerization, a deoxidizer may be added to the reaction system to prevent polymerization inhibition due to oxygen. Examples of the deoxidizer include a combination of glucose and glucose oxidase. In addition, the radical polymerization may be performed under an atmosphere of inert gas such as nitrogen and argon.

When the polymeric material constituting the hydrogel is polysaccharides or proteins, the three-dimensional network structure may be formed by physical bond of the polysaccharides or proteins, or the three-dimensional network structure may be formed by crosslinking of the polysaccharides or proteins using a cross-linking agent. Examples of the cross-linking agent include glutaraldehyde.

The shape of the hydrogel layer 20 is not particularly limited, and various shapes may be selected in accordance with the use and application. For example, the hydrogel layer 20 may have a film shape, a plate shape, a block shape, or the like. Among them, the shape of the hydrogel layer 20 is preferably a film shape.

The thickness of the hydrogel layer 20 is not particularly limited, but is preferably a thickness having a structural strength that does not collapse under its own weight. For example, when a hydrogel containing polyacrylamide is used as the forming material of the hydrogel layer 20, the thickness of the hydrogel layer 20 is preferably 50 µm to 1000 µm, more preferably 120 µm to 200 µm.

The strength of the hydrogel layer 20 can be enhanced by increasing the cross-links of the polymeric material constituting the hydrogel by chemical crosslinking or physical crosslinking, or by increasing the concentration of the polymeric material constituting the hydrogel.

For example, when the monomer (precursor) of acrylamide is polymerized to prepare a hydrogel containing polyacrylamide, the monomer concentration is preferably 0.8 mol/L to 8 mol/L, more preferably 2 mol/L to 4 mol/L.

In addition, when methylene bisacrylamide is used as the chemical cross-linking agent for polymerization of the monomer of the acrylamide, the concentration of the cross-linking agent is preferably 0.01 mol % to 2.0 mol %, more preferably 0.03 mol % to 1 mol % with respect to the monomer.

The hydrogel may include various additives. The type of the additive is not particularly limited as long as it does not inhibit hydrogel formation. Examples of the additives include biomolecules that improve bioaffinity, silver nanoparticles or surfactants for expression of an antimicrobial property, ionic liquid or conductive polymers for increasing conductivity, and magnetic nanoparticles for causing a reaction to a magnetic field. By adding the above-mentioned additives to the hydrogel, desired properties can be imparted to the hydrogel.

Laminate

In the laminate 1, an adhesive region 1a where the base member 10 and the hydrogel layer 20 adhere to each other, and a non-adhesive region 1b where the base member 10 and the hydrogel layer 20 do not adhere to each other are formed at the interface between the base member 10 and the hydrogel layer 20.

In the laminate 1 illustrated in FIGS. 1 and 2, the non-adhesive region 1b are provided in a band shape on a surface of the base member 10. The adhesive region of the laminate 1 is provided on both sides of the extending direction of the non-adhesive region 1b. Note that the pattern of the adhesive region 1a and the non-adhesive region 1b illustrated in the drawings is merely an example, and various pattern shapes may be adopted in accordance with the design.

Figure 3:
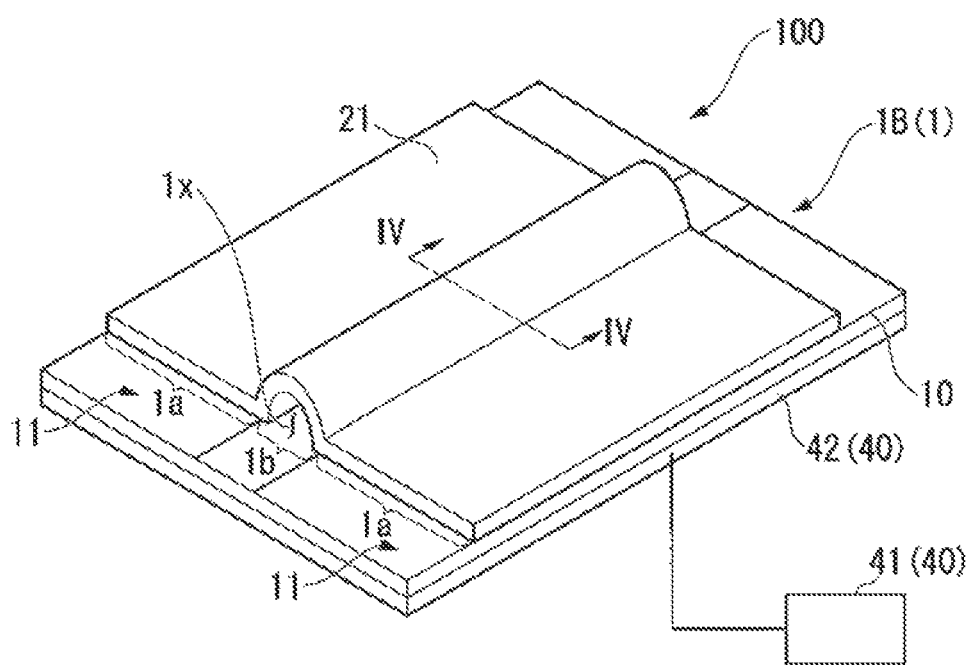
FIG. 3 is a schematic perspective view of the laminate 1 and the shape control device 100.
Figure 4:
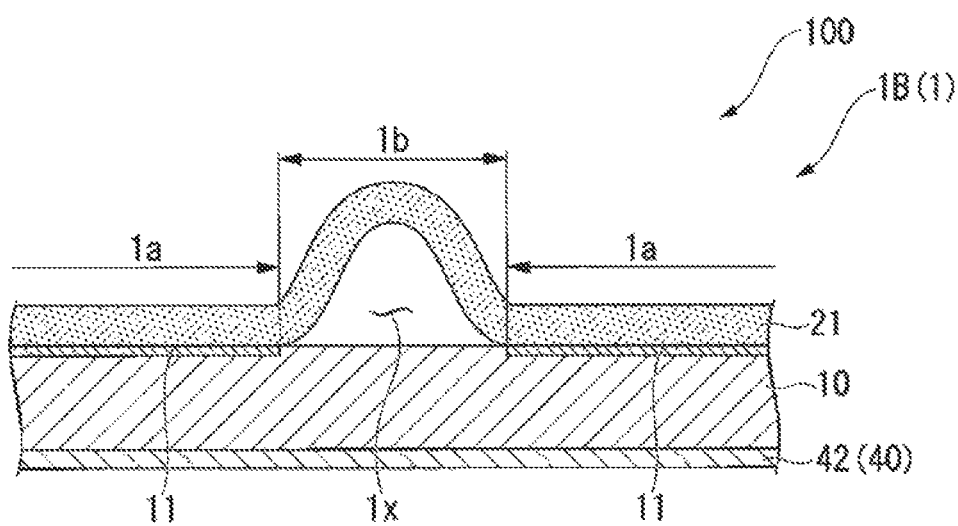
FIG. 4 is a cross-sectional view taken along a line Iv-Iv of FIG. 3.

FIGS. 3 and 4 are explanatory diagrams illustrating a state where the hydrogel layer 20 of the laminate 1 is swollen. FIG. 3 is a schematic perspective view of the laminate 1 and the shape control device 100, and corresponds to FIG. 1. FIG. 4 is a cross-sectional view taken along a line Iv-Iv in FIG. 3, and corresponds to FIG. 2.

In FIGS. 3 and 4, the hydrogel layer after the swelling is indicated by reference numeral 21. In the following description, for the sake of distinction between before and after the swelling of the hydrogel layer, the laminate 1 including the hydrogel layer 20 before the swelling may be referred to as "laminate 1A", and the laminate 1 including the hydrogel layer 21 after the swelling may be referred to as "laminate 1B".

The hydrogel layer 21 of the laminate 1B is not fixed to the base member 10 in the non-adhesive region 1b. In addition, the hydrogel layer 21 of the laminate 1B is fixed to the base member 10 in the adhesive region 1a.

Therefore, in the hydrogel layer 21, the volume of the portion that two-dimensionally overlaps the non-adhesive region 1b can freely increase in the extending direction of the non-adhesive region 1b and the direction away from the base member 10 when the volume is increased due to the swelling. On the other hand, in the portion that two-dimensionally overlaps the non-adhesive region 1b, the increase in volume in the direction intersecting the extending direction of the non-adhesive region 1b is restricted.

As a result, in the laminate 1B, the portion that two-dimensionally overlaps the non-adhesive region 1b largely deforms in the direction away from the base member 10 in order to mitigate the increase in internal pressure due to the increase in volume.

Thus, a tubular channel 1x surrounded by the hydrogel layer 21 and the base member 10 is formed in the laminate 1B. FIGS. 3 and 4 illustrate a state where the tubular channel 1x is formed along the non-adhesive region 1b formed in a band shape.

The shape of the tubular channel 1x can be controlled by controlling the pattern shape of the adhesive region 1a and the non-adhesive region 1b.

In addition, the shape of the tubular channel 1x can be controlled by adjusting the type of the hydrogel layer 21, the ratio between the shear modulus of the base member 10 and the shear modulus of the hydrogel layer 21, the thickness of the hydrogel layer 21, and the like. The shear modulus of the hydrogel layer 21 and the swelling ratio of the hydrogel layer 21 can be controlled by changing the type of monomer of the polymeric material constituting the hydrogel layer 21, the type and the amount of the cross-linking agent to be used, and the like.

The above-described change in shape occurs due to the difference between the swelling ratio of the hydrogel layer 20 of the laminate 1A and the swelling ratio of the hydrogel layer 21 of the laminate 1B. The change between the hydrogel layer 20 and the hydrogel layer 21 is reversible. Therefore, in the laminate 1, the shape of the tubular channel 1x can be controlled by controlling the swelling ratio of the hydrogel layer. The swelling ratio of the hydrogel layer can be controlled by swelling the hydrogel layer by bringing water into contact thereto, drying the hydrogel layer, or the like.

Further, when a stimuli-responsive hydrogel is used as the forming material of the hydrogel layer 21, the swelling ratio of the hydrogel layer 21 can be changed in accordance with a stimulus input to the hydrogel layer 21. Thus, the shape of the tubular channel 1x can be controlled.

Input Unit

The input unit 40 provided in the shape control device 100 inputs, to the hydrogel layer 20, a stimulus that causes the stimuli-responsive hydrogel to react. The input unit 40 includes an electrode 41 and a power source 42. The electrode 41 has a rectangular shape that is the same shape as the base member 10 in the field of view as viewed from the normal direction of the base member 10.

The electrode 41 is formed on a surface opposite to a surface on which the hydrogel layer 20 is formed in the base member 10. The power source 42 is electrically connected to the electrode 41. In the base member 10, the surface on which the hydrogel layer 20 is formed is "front surface", and the surface opposite the front surface is "back surface".

For example, in the case where a hydrogel that responds to a thermal stimulus is used as the forming material of the hydrogel layer 20, the degree of swelling of the hydrogel changes in accordance with the heat generated by the electrode 41 when the power is supplied from the power source 42 to the electrode 41 and the electrode 41 generates heat. Thus, the shape of the tubular channel 1x of the shape control device 100 can be controlled.

In the drawings, the shape of the electrode 41 has a rectangular shape that is the same shape as the base member 10 and covers the entire back surface of the base member 10, but the shape of the electrode 41 is not limited to this. The electrode 41 may be selectively provided in a portion of the back surface of the base member 10.

In addition, the base member 10 may be used as a portion of the input unit 40 when the forming material of the base member 10 is a material that generates heat in response to light reception, a conductor as a material that generates heat in response to energization, a magnetic metal body as a material that generates heat in response to a stimulus from a magnetic field, a piezoelectric element as a material that generates electric power in response to stress, a light emitting element as a material that emits light in response to energization, or the like.

Further, the input unit preferably has a configuration that can input a proper stimulus to the hydrogel layer in accordance with the type of the stimuli-responsive hydrogel. For example, when a hydrogel that responds to a light stimulus is used as the forming material of the hydrogel layer, the shape control device may include a light source device as the input unit.

Method of Producing Laminate

Next, a method of producing a laminate will be described.

First Producing Method

Figure 5:
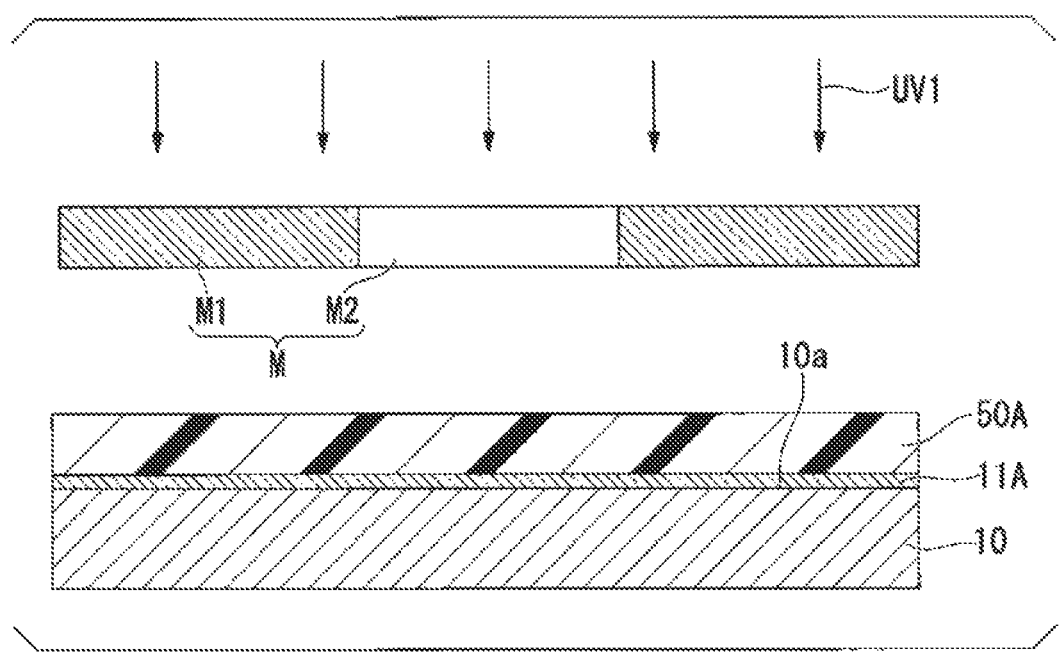
FIG. 5 is a diagram illustrating a step of a method of producing a laminate (first producing method).
Figure 6:
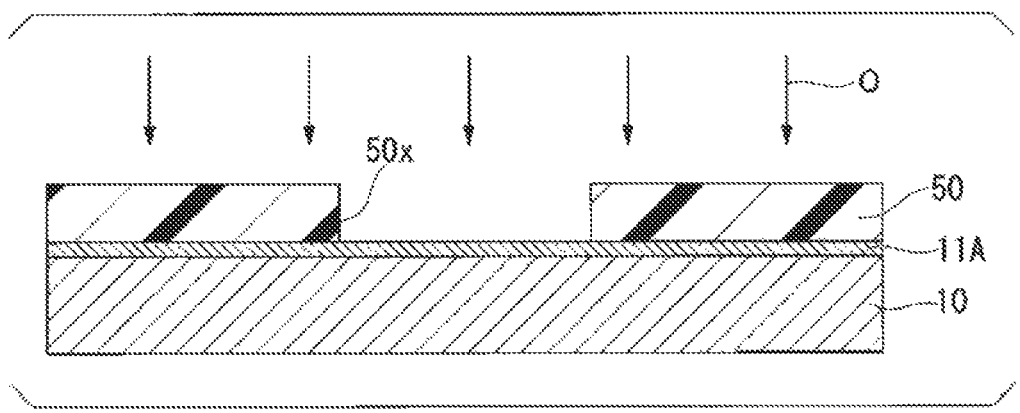
FIG. 6 is a diagram illustrating a step of the method of producing the laminate (first producing method).
Figure 7:
FIG. 7 is a diagram illustrating a step of the method of producing the laminate (first producing method).
Figure 8:
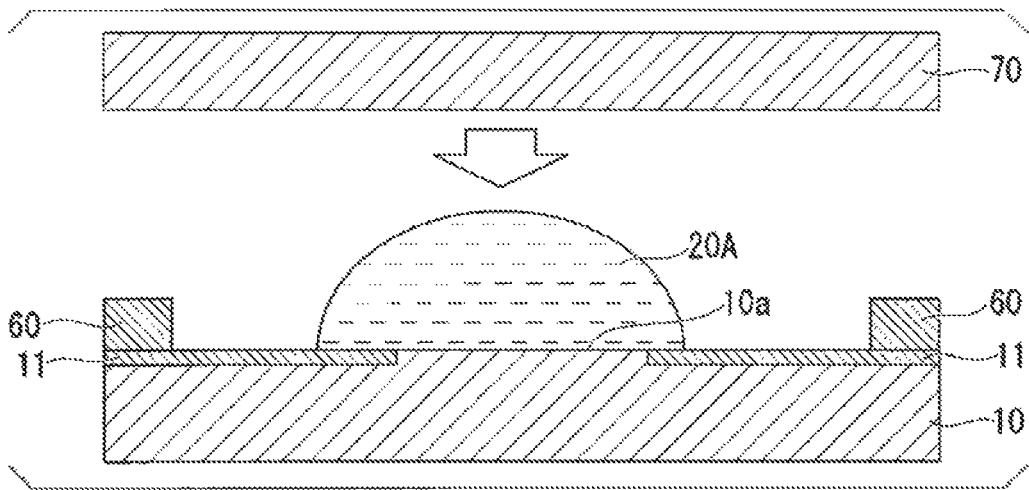
FIG. 8 is a diagram illustrating a step of the method of producing the laminate (first producing method).
Figure 9:
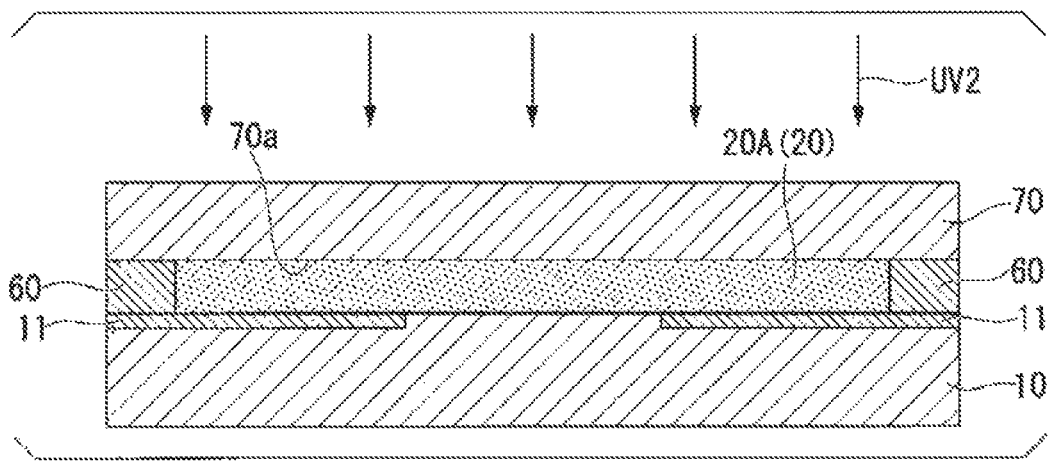
FIG. 9 is a diagram illustrating a step of the method of producing the laminate (first producing method).
Figure 10:
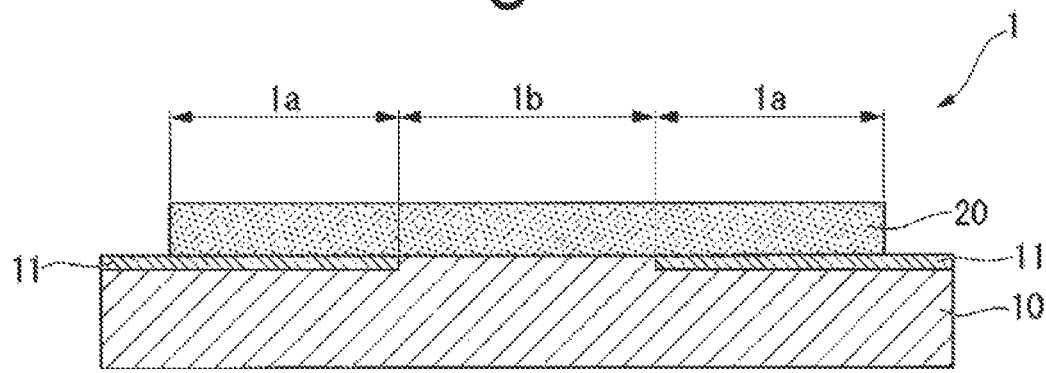
FIG. 10 is a diagram illustrating a step of the method of producing the laminate (first producing method).

FIGS. 5 to 10 are diagrams illustrating steps of a method of producing a laminate (first producing method). FIGS. 5 to 7 are diagrams illustrating "forming a pattern" in the present disclosure. FIG. 8 is a diagram illustrating "applying a precursor solution" in the present disclosure. FIGS. 9 and 10 are diagrams illustrating "polymerizing the precursor" in the present disclosure.

First, as illustrated in FIG. 5, a layer 11A of a silane coupling agent and a resist layer 50A are stacked on a surface 10a of the base member 10. For example, a glass substrate is used as the base member 10.

A silane coupling agent having an adhesive functional group is used as the silane coupling agent as the forming material of the layer 11A. The "adhesive functional group" herein refers to a functional group that is polymerizable with the monomer (precursor) of the polymeric material constituting the hydrogel described above.

For example, when an acrylic monomer is used as a monomer, examples of the adhesive functional group include a (meth) acrylic group. In this case, for example, 3-(methacryloyloxy) propyltrimethoxysilane may be used as the silane coupling agent.

The layer 11A can be formed by performing washing with a sodium hydroxide solution and treatment with an oxygen plasma or a piranha solution on the surface 10a of the base member 10, and then applying a silane coupling agent to the surface 10a. The piranha solution is a common name for a mixture of concentrated sulfuric acid and hydrogen peroxide solution. The layer 11A is a monomolecular layer of the silane coupling agent. With the layer 11A, the adhesive functional group is introduced to the surface 10a of the base member 10.

The resist layer 50A is a layer formed of a positive photoresist, for example. The resist layer 50A can be formed by applying the positive photoresist to the surface of layer 11A. The application method may be, for example, a spin coating method.

Next, the resist layer 50A is irradiated with an ultraviolet ray UV1 through a mask M including a light-blocking portion M1 and a light-transmissive portion M2. The peak wavelength of the ultraviolet ray UV1 is included in the absorption wavelength band of the positive photoresist. By performing development after the irradiation with ultraviolet ray UV1, the portion irradiated with the ultraviolet ray UV1 in the resist layer 50A is removed.

Next, through the resist layer 50 in which an opening 50x is formed, an oxygen plasma treatment using oxygen plasma O is performed on the layer 11A exposed at an opening 50x as illustrated in FIG. 6. In this manner, the silane coupling agent of the layer 11A exposed at the opening 50x is removed.

Next, as illustrated in FIG. 7, by removing the resist layer 50, a layer 11 of the silane coupling agent having a pattern shape is obtained. The shape of the layer 11 can be appropriately adjusted by changing the shape of the light-transmissive portion M2 in the mask M.

Next, as illustrated in FIG. 8, a spacer 60 is disposed at the surface 10a where the layer 11 is formed, and a monomer solution 20A of the polymeric material that constitutes the hydrogel is dripped to the region surrounded by the spacer 60. The monomer solution corresponds to the precursor solution in the present disclosure.

The monomer solution 20A contains a monomer of the above-described polymeric material that constitutes the hydrogel, a photopolymerization initiator, and, as necessary, an organic solvent. As the monomer, a monomer having a functional group that is polymerizable with the adhesive functional group contained in the layer 11 is used. For example, an acrylic monomer having an acrylic group may be used as the monomer contained in the monomer solution 20A.

Examples of the organic solvent that may be contained in the monomer solution include dimethyl sulfoxide (DMSO), dimethylformamide (DMF), dimethyl acetamide (DMA), and ethylene carbonate (EC).

Thereafter, a sealing substrate 70 having ultraviolet permeability is placed to cover the monomer solution 20A such that the monomer solution 20A is spread across the region surrounded by the spacer 60. For example, a glass substrate may be used as the sealing substrate 70. The surface of the sealing substrate 70 that makes contact with the monomer solution 20A is preferably washed through an oxygen plasma treatment.

Next, as illustrated in FIG. 9, an ultraviolet ray UV2 is applied through the sealing substrate 70. The peak wavelength of the ultraviolet ray UV2 is included in the absorption wavelength band of the photopolymerization initiator contained in the monomer solution 20A. The peak wavelength of the ultraviolet ray UV2 is, for example, 365 nm.

Through the irradiation by ultraviolet ray UV2, the monomer contained in the monomer solution 20A is polymerized and a polymeric material is obtained. At this time, the functional group of the monomer and the adhesive functional group of the silane coupling agent of the layer 11 are polymerized, and thus the monomer solution 20A that overlaps the layer 11 adheres to the surface 10a of the base member 10. At the same time, in the region where the layer 11 is not formed in the base member 10, the monomers contained in the monomer solution 20A are polymerized therebetween without adhering to the base member 10.

Next, as illustrated in FIG. 10, the sealing substrate 70 is removed, and the polymer of the monomer solution 20A is immersed in a large excess amount of pure water to remove the unreacted monomer and swell the polymeric material resulting from the polymerization with water. In this manner, the hydrogel layer 20 in which the polymeric material is swollen with water is obtained.

In addition, the portion of the hydrogel layer 20 that overlaps the layer 11 serves as the adhesive region 1a and the portion of the hydrogel layer 20 that does not overlap the layer 11 serves as the non-adhesive region 1b. As described above, in the hydrogel layer 20, the portion of the hydrogel layer that overlaps the non-adhesive region 1b deforms in accordance with the degree of swelling, and thus a tubular channel is formed.

Note that the shape of the hydrogel layer 20 can be controlled by the size of the spacer 60, the shape of the spacer 60, and the like. In addition, since the shape of a surface 70a (see FIG. 9) of the sealing substrate 70 on the side facing the base member 10 is transferred to the obtained hydrogel layer 20, the shape of the hydrogel layer 20 can be controlled by controlling the shape of the surface 70a.

In the above-mentioned manner, the laminate 1 is obtained.

Second Producing Method

FIGS. 11 to 15 are diagrams illustrating steps of a method of producing a laminate (second producing method).

Figure 11:
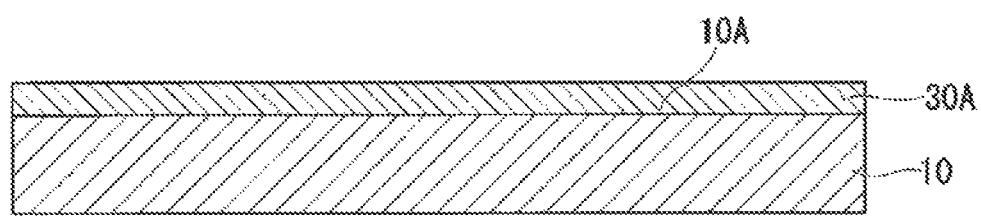
FIG. 11 is a diagram illustrating a step of a method of producing a laminate (second producing method).
Figure 12:
FIG. 12 is a diagram illustrating a step of the method of producing the laminate (second producing method).
Figure 13:
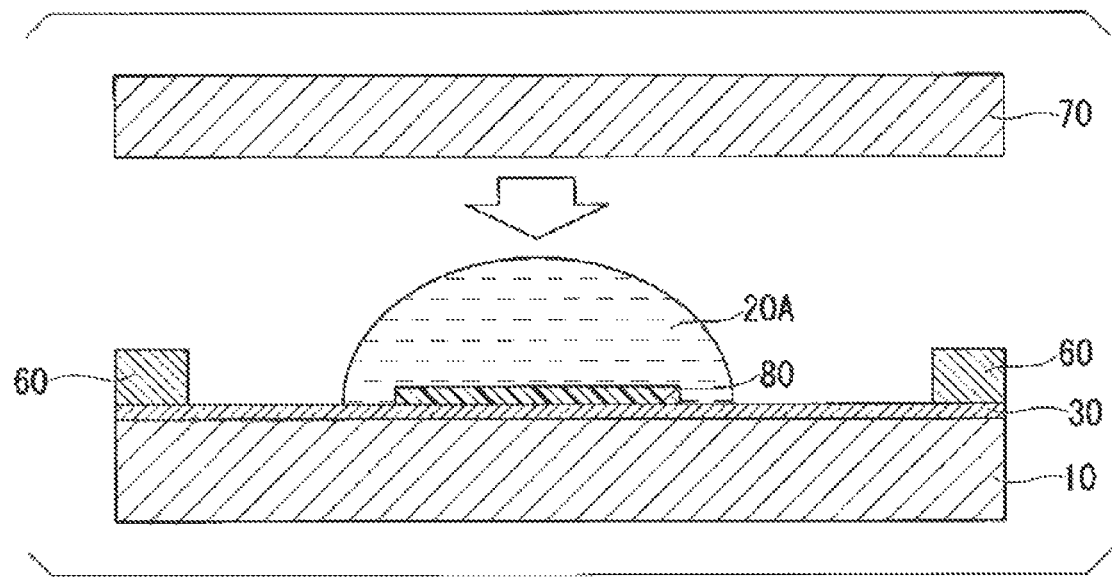
FIG. 13 is a diagram illustrating a step of the method of producing the laminate (second producing method).

FIGS. 11 and 12 are diagrams illustrating "forming a layer of a polymerization initiator" in the present disclosure. FIG. 13 is a diagram illustrating "applying a precursor solution" in the present disclosure.

Figure 14:
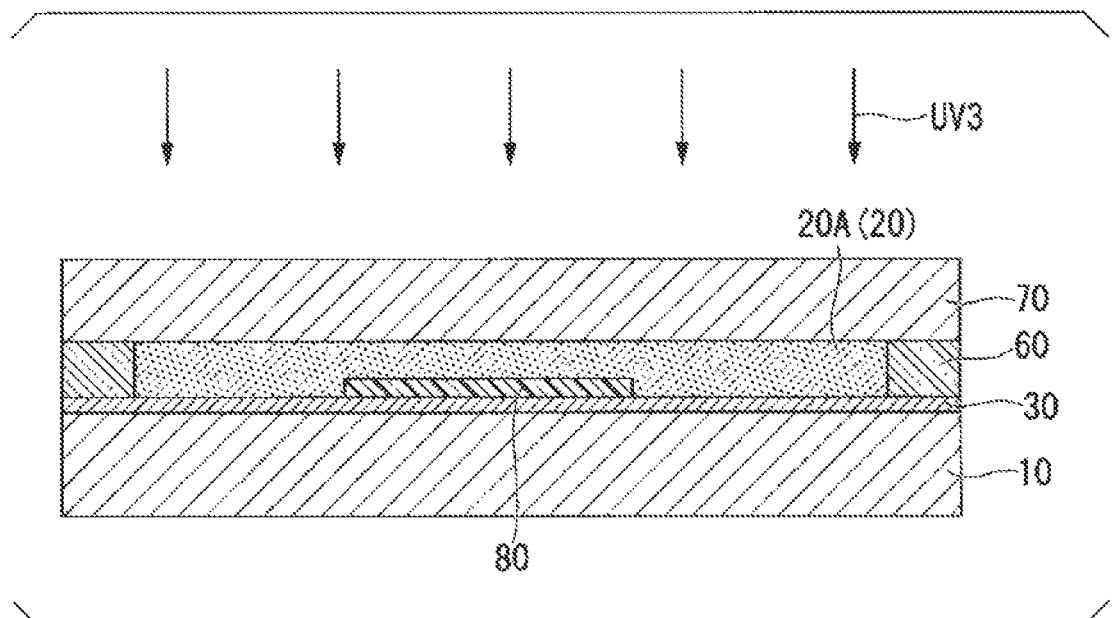
FIG. 14 is a diagram illustrating a step of the method of producing the laminate (second producing method).
Figure 15:
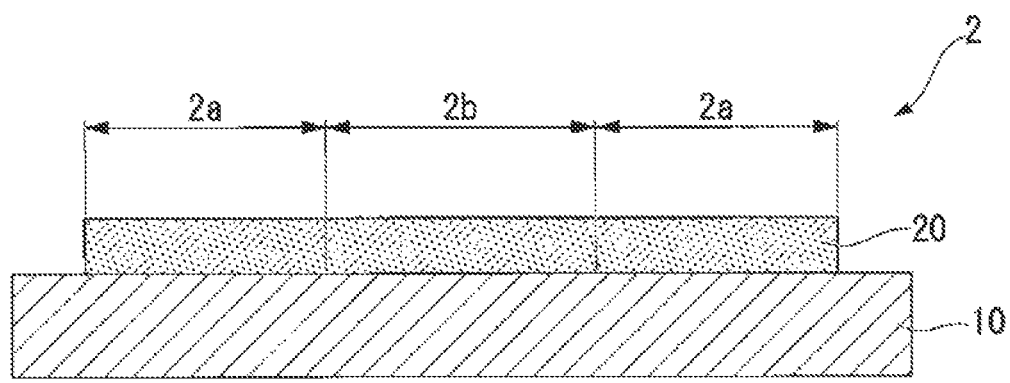
FIG. 15 is a diagram illustrating a step of the method of producing the laminate (second producing method).

FIGS. 14 and 15 are diagrams illustrating "polymerizing the precursor" in the present disclosure.

First, as illustrated in FIG. 11, a coating film 30A of a photopolymerization initiator solution is formed on a surface 11a of the base member 10. As the base member 10, it is preferable to use a resin substrate of an elastomer, a polymer film or the like that allows infiltration of an organic solvent, for example.

Examples of the organic solvent that can infiltrate the resin substrate include polar solvents such as methanol, ethanol, and acetone.

In addition, a hydrogen abstraction-type photopolymerization initiator is used as the photopolymerization initiator. Examples of the hydrogen abstraction-type photopolymerization initiator include benzophenone, Michlers & ketone and Michlers ethyl ketone. Examples of the solvent for the photopolymerization initiator solution include polar solvents such as ethanol and acetone.

Next, as illustrated in FIG. 12, the solvent is removed from the coating film 30A to form a layer 30 of the photopolymerization initiator. In addition, since the polar solvent used for the photopolymerization initiator solution can infiltrate the resin substrate, a portion of the photopolymerization initiator enters the resin substrate along with the infiltration of the solvent into the resin substrate.

Next, as illustrated in FIG. 13, a mask material 80 is disposed at the portion where the non-adhesive region is to be formed in the surface 10a where the layer 30 is formed. As the mask material 80, a member formed of a material that does not react with the monomer of the polymeric material constituting the hydrogel is used. For example, a paraffin film may be used as the mask material 80.

In addition, the spacer 60 is disposed at the surface 10a where the layer 30 is formed, and a monomer solution 20B of the polymeric material that constitutes the hydrogel is dripped to the region surrounded by the spacer 60.

The monomer solution 20B contains a monomer of the above-described polymeric material that constitutes the hydrogel, a hydrogen abstraction-type photopolymerization initiator, and, as necessary, an organic solvent. Note that, when the concentration of the hydrogen abstraction-type photopolymerization initiator contained in the layer 30 is sufficiently high, the monomer solution 20B may not include the hydrogen abstraction-type photopolymerization initiator. The case where the "concentration is sufficiently high" refers to, for example, a case where the concentration of the photopolymerization initiator is 10 mass % or greater in the photopolymerization initiator solution used to form the coating film 30A.

Thereafter, the sealing substrate 70 having ultraviolet permeability is placed to cover the monomer solution 20B such that the monomer solution 20B is spread across the region surrounded by the spacer 60.

Next, as illustrated in FIG. 14, an ultraviolet ray UV3 is applied through the sealing substrate 70. The peak wavelength of the ultraviolet ray UV3 is included in the absorption wavelength band of the photopolymerization initiator contained in the layer 30. The peak wavelength of the ultraviolet ray UV3 is, for example, 365 nm.

The polymerization initiator is caused to react in a predetermined pattern through the irradiation with the ultraviolet ray UV3. In other words, through the irradiation with the ultraviolet ray UV3, the photopolymerization initiator of the layer 30 abstracts hydrogen atoms from the base member 10 in the pattern of the mask material 80 in a portion where the mask material 80 is not overlapping in the layer 30. As a result, radicals as reaction starting points are generated at the base member 10. The monomer contained in the monomer solution 20B is polymerized from the radical generated at the base member 10, and thus a polymeric material is obtained. As such, the resulting polymeric material (i.e., the hydrogel layer) adheres to the base member 10.

In contrast, in the portion where the mask material 80 is overlapping in the layer 30, the ultraviolet ray UV3 is blocked, and hydrogen atom abstraction from the base member 10 with the photopolymerization initiator does not occur. Alternatively, even when a hydrogen atom is abstracted from the base member 10 and a radical is generated, the generated radical does not react with the monomer contained in the monomer solution 20B since the monomer solution 20B is not in contact with it. Thus, in the portion where the mask material 80 is overlapping in the layer 30, the monomers contained in the monomer solution 20B are polymerized therebetween without adhering to the base member 10.

Next, as illustrated in FIG. 15, the sealing substrate 70 is removed and the polymer of the monomer solution 20B is immersed in a large excess amount of pure water to remove the unreacted monomer and swell the polymeric material resulting from the polymerization with water. In this manner, the hydrogel layer 20 in which the polymeric material is swollen with water is obtained.

In addition, the portion of the hydrogel layer 20 that overlaps the layer 30 serves as an adhesive region 2a, and the portion of the hydrogel layer 20 that does not overlap the layer 30 serves as a non-adhesive region 2b. As described above, in the hydrogel layer 20, the portion of the hydrogel layer that overlaps the non-adhesive region 2b deforms in accordance with the degree of swelling, and thus a tubular channel is formed.

Note that in the above description, the monomer is polymerized by causing the polymerization initiator to react in a pattern by using the mask material 80, but the present disclosure is not limited thereto.

For example, when the layer 30 illustrated in FIG. 12 is selectively irradiated with an ultraviolet ray only in the portion where the non-adhesive region is to be formed, the photopolymerization initiator in the portion irradiated with the ultraviolet ray is excited, and bonded to the substrate surface by abstracting the hydrogen of the substrate surface. In this manner, the photopolymerization initiator in the portion irradiated with the ultraviolet ray may be fixed to the substrate in advance. This ultraviolet irradiation is referred to as "first".

After the first ultraviolet irradiation, the surface of the substrate is washed using the polar solvent contained in the photopolymerization initiator solution. In this manner, the photopolymerization initiator other than the photopolymerization initiator fixed to the substrate can be removed from the substrate surface.

Next, when the base member 10 subjected to the first ultraviolet irradiation is further irradiated with a second ultraviolet ray, the photopolymerization initiator that is fixed to the substrate surface by the first ultraviolet irradiation so as to remain in a predetermined pattern is caused to react. Therefore, after the pattern of the photopolymerization initiator is formed by the first ultraviolet irradiation, the monomer solution 20B is disposed on a surface of the base member 10, and the monomer is polymerized by performing the second ultraviolet irradiation, thereby forming the adhesive region 2a by causing a reaction of the photopolymerization initiator fixed to the substrate surface with the monomer. Thus, the laminate 2 including the adhesive region 2a and the non-adhesive region 2b is obtained.

In addition, it is possible to selectively form a film of a silane coupling agent containing a water-and-oil-repellent functional group on the surface 10a of the base member 10 in advance before forming the coating film 30A illustrated in FIG. 11.

When the coating film 30A is formed on the base member 10 subjected to the above-described process, the film of the silane coupling agent repels the photopolymerization initiator solution, and the coating film 30A of the photopolymerization initiator solution is formed in a pattern shape that is complementary to the film of the silane coupling agent. Examples of such a silane coupling agent include (trichloro (1H, 1H, 2H, 2H-heptadecafluorodecyl) silane.

The layer 30 is formed from the coating film 30A formed in a predetermined pattern, and the monomer solution 20B is disposed on a surface of the base member 10, and, the monomer is polymerized through irradiation with an ultraviolet ray. The sealing substrate 70 is removed and the polymer of the monomer solution 20A is immersed in a large excess amount of pure water to remove the unreacted monomer and swell the polymeric material resulting from the polymerization with water. As a result, the adhesive region 2a and the non-adhesive region 2b are formed.

In the above-described manner, the laminate 2 is obtained.

Third Producing Method

Figure 16:
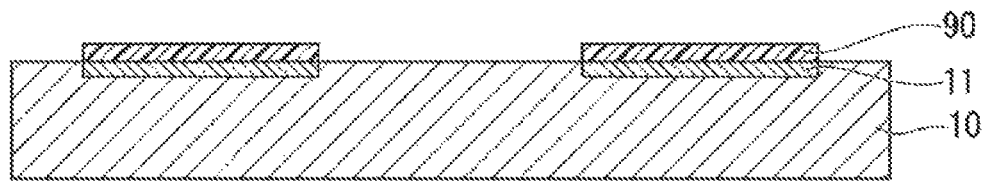
FIG. 16 is a diagram illustrating a step of a method of producing a laminate (third producing method).
Figure 17:
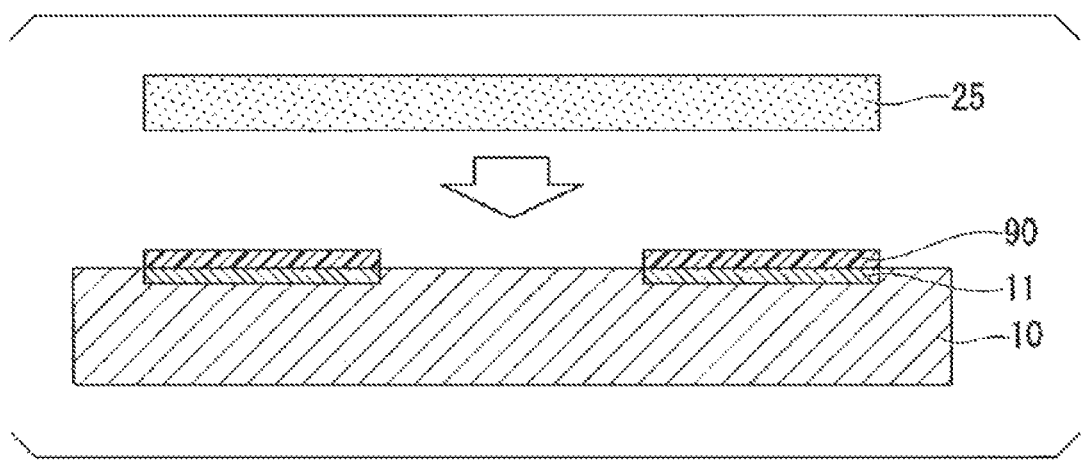
FIG. 17 is a diagram illustrating a step of the method of producing the laminate (third producing method).
Figure 18:
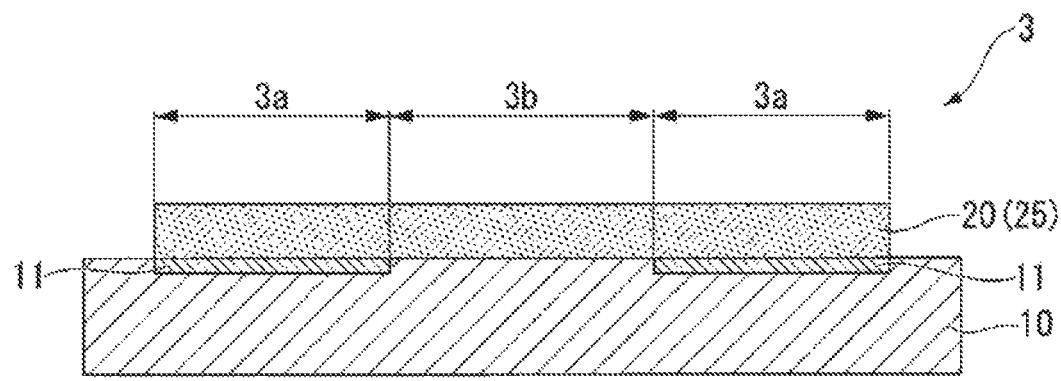
FIG. 18 is a diagram illustrating a step of the method of producing the laminate (third producing method).

FIGS. 16 to 18 are diagrams illustrating steps of a method of producing a laminate (third producing method).

FIG. 16 is a diagram illustrating "forming a pattern of a gel intrusive polymer" in the present disclosure. FIGS. 17 and 18 are diagrams illustrating "bringing . . . into contact" in the present disclosure.

First, as illustrated in FIG. 16, the layer 11 of a silane coupling agent having a pattern shape is formed at the surface 10a of the base member 10. The silane coupling agent to be used and the method of forming the pattern shape may be the same as the material and method of the first producing method.

Thereafter, a layer 90 of a gel intrusive polymer is formed at the surface of the layer 11 to form a pattern of the gel intrusive polymer. When forming the layer 90, a reaction is caused using a known grafting to method or a known grafting from method between the gel intrusive polymer and the adhesive functional group of the silane coupling agent.

Examples of the gel intrusive polymer include chitosan, alginic acid, and polyvinyl alcohol.

Next, as illustrated in FIG. 17, a sheet member 25 formed of a hydrogel is disposed to cover the layer 90 formed in a pattern such that the sheet member 25 and the gel intrusive polymer constituting the layer 90 are brought into contact with each other. When the layer 90 and the sheet member 25 make contact with each other, the gel intrusive polymer contained in the layer 90 enters the sheet member 25 and intertwines with the network of the hydrogel. In this manner, the gel intrusive polymer and the hydrogel are physically or chemically bonded to each other, and the sheet member 25 and the base member 10 can adhere to each other.

When bringing the sheet member 25 into contact with the layer 90, the pH of the hydrogel constituting the sheet member 25 may be changed. Alternatively, a low molecular weight cross-linking agent, which is typified by glutaraldehyde, may be diffused in the sheet member 25 at the same time. In this manner, the physical bond or the chemical bond between the gel intrusive polymers are formed, and the gel intrusive polymer and the hydrogel can be more strongly bonded.

Thus, as illustrated in FIG. 18, the portion of the sheet member 25 that overlaps the layer 90 serves as an adhesive region 3a, and the portion of the sheet member 25 that does not overlap the layer 90 serves as a non-adhesive region 3b.

In the above-described manner, a laminate 3 is obtained.

Fourth Producing Method

By forming a pattern of a cyanoacrylate-based adhesive on the base member 10 and bringing it into contact with the sheet member 25, anionic polymerization of the cyanoacrylate monomer using moisture in the sheet member 25 as an initiator is initiated, and thus they can be firmly bonded. In this case, the portion where the sheet member 25 and the adhesive overlap each other serves as an adhesive region, and the portion where the sheet member 25 and the adhesive do not overlap each other serves as a non-adhesive region.

The pattern of the adhesive can be formed by known lithographic techniques. The size of the pattern of the adhesive depends on the resolution of the lithographic technique to be used.

The lithographic technique to be used is not particularly limited, and may be a method using a photomask, a method using a patterned UV source, micro contact patterning for transferring a preliminarily formed pattern to a surface of the base member 10, or the like.

In the above-described manner, a laminate according to the present embodiment is obtained.

According to the laminate having the above-described configuration, a novel structure whose shape is easy to control is obtained.

In addition, according to the above-described method of producing a laminate, the above-described laminate can be easily produced.

In addition, according to the above-described shape control device, a shape control device whose shape can be easily controlled can be provided.

Preferred embodiment examples of the present disclosure have been described with reference to the accompanying drawings, but the present disclosure is not limited to these examples. The shapes, combinations, and the like of each of the constituent members illustrated in the above-described examples can be varied based on design requirements and the like within a range that does not deviate from the spirit of the present disclosure.

EXAMPLES

The present disclosure will be described below with examples, but the present disclosure is not limited to the examples.

Example 1

A laminate was produced by the above-described first producing method.

First, the glass substrate, which is the base member, was washed with sodium hydroxide solution and further treated with an oxygen plasma. Thereafter, a silane coupling agent was applied to the plasma-treated surface of the glass substrate. As the silane coupling agent, a silane coupling agent having a methacrylic group was used.

Next, the surface on which the silane coupling agent was applied was spin coated with a positive photoresist, and thus a resist layer was formed. The resist layer having an opening with a width of 1 mm was formed by development through irradiation, through a mask, with an ultraviolet ray having a peak wavelength in the absorption wavelength band of the used positive photoresist in a strip shape with a line width of 1 mm.

Next, after performing an oxygen plasma treatment, the resist layer was removed with acetone to obtain a base member in which a pattern of an adhesive functional group is formed. Specifically, the formed pattern was a pattern having a band shape with a width of 1 mm where an adhesive functional group is not formed.

Next, a spacer having a thickness of 120 µm was disposed at the surface where the pattern of the adhesive functional group is formed in the base member, and a monomer solution was dropped to the center of the base member. The monomer solution contains acrylamide as a monomer, bisacrylamide as a cross-linking agent, and LAP as a photopolymerization initiator. In the used monomer solution, the concentration of the acrylamide was 4 mol/L, and the concentration of the photopolymerization initiator was 0.1 mol % with respect to the monomer.

Next, a glass substrate subjected to the oxygen plasma treatment was placed to cover the monomer solution, and thus the monomer solution was sandwiched between the base member and the sealing substrate. Here, the glass substrate placed to cover the monomer solution corresponds to the sealing substrate in the above embodiment.

Next, the monomer solution was irradiated with an ultraviolet ray from above the sealing substrate through a band pass filter of a wavelength of 365 nm. After the light irradiation, the sealing substrate was removed and the unreacted gel precursor molecules were removed through immersion in a large excess amount of pure water to obtain a laminate of Example 1.

In the obtained laminate, the portion having a width of 1 mm where the pattern of the adhesive functional group is not formed serves as a non-adhesive region, and the portion where the pattern of the adhesive functional group is formed serves as an adhesive region.

In Example 1, laminates were produced by changing the concentration of the cross-linking agent contained in the monomer solution to 0.03 mol %, 0.05 mol %, 0.1 mol %, 0.3 mol %, and 0.5 mol % with respect to the monomer. The influence of the concentration of the cross-linking agent on the shape of the hydrogel layer was confirmed by swelling the hydrogel layer of each laminate.

Figure 19:
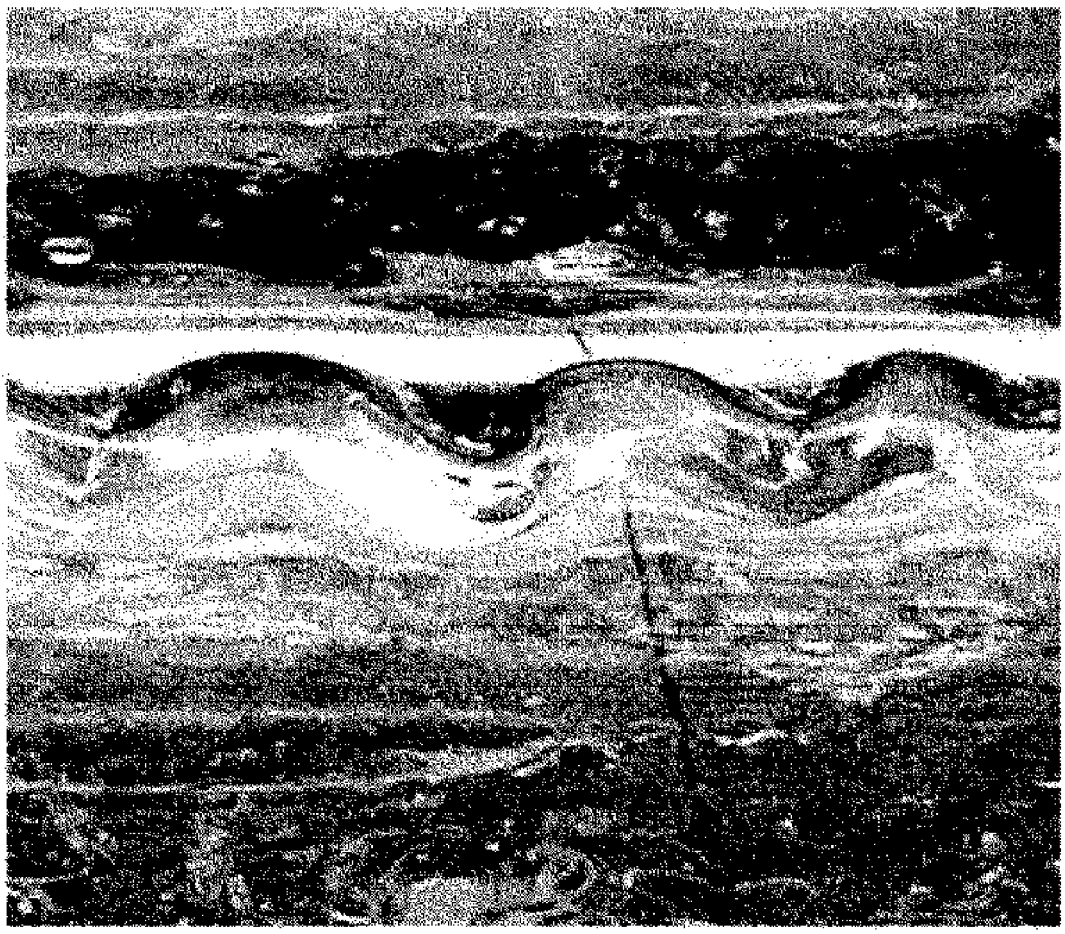
FIG. 19 is a photograph of a hydrogel layer of a laminate obtained in Example 1.

FIG. 19 is a photograph of the hydrogel layer of the laminate obtained in Example 1, and is a photograph of the hydrogel layer taken from diagonally above the laminate. As illustrated in the drawing, a wavy curved portion is formed in the hydrogel layer. This curved portion is a portion that overlaps the non-adhesive region of the hydrogel layer.

Figure 20:
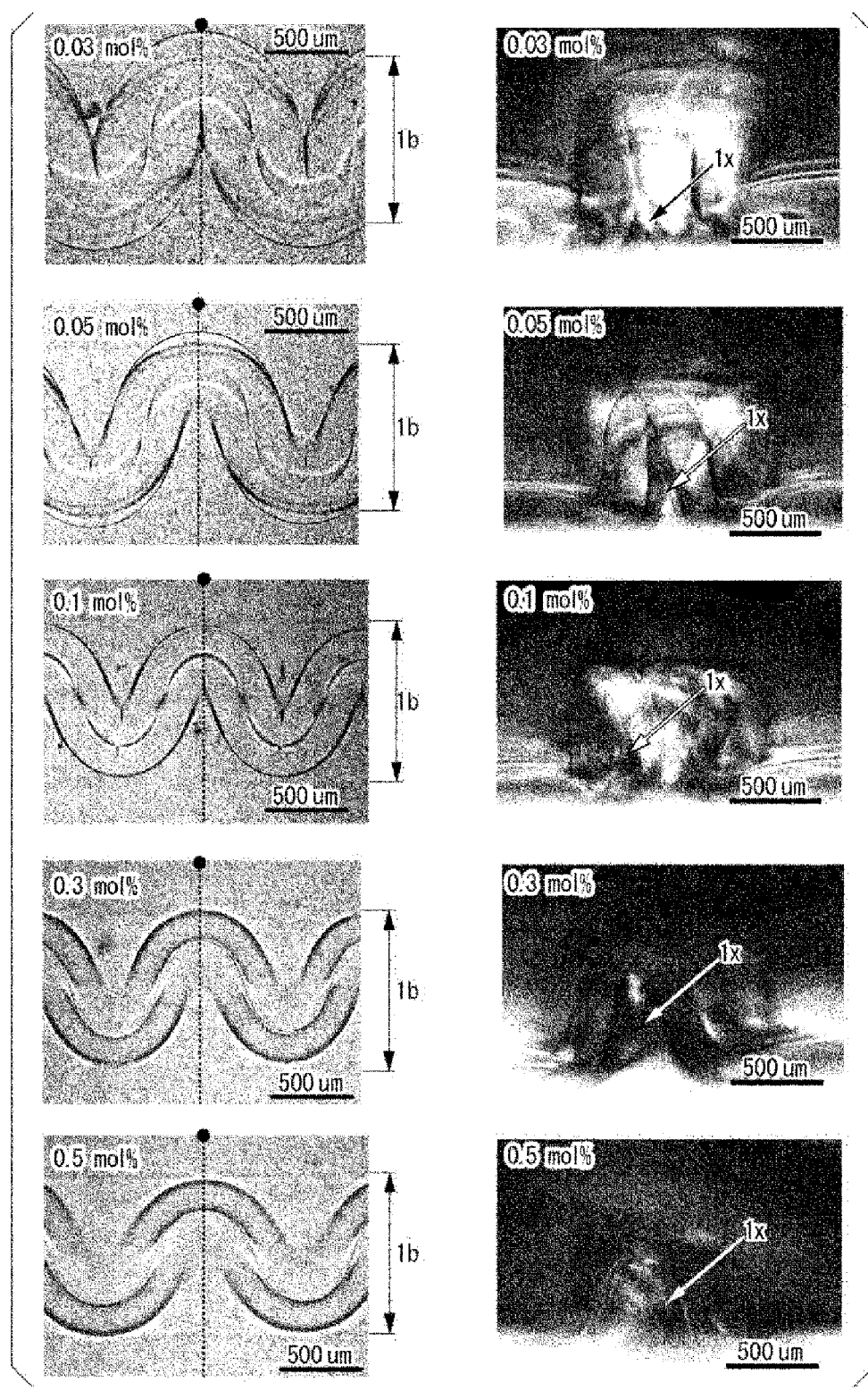
FIG. 20 is photographs of each laminate of Example 1.

FIG. 20 is photographs of the laminates of Example 1. Each photograph on the left side in FIG. 20 is a photograph of the hydrogel layer when the laminate is viewed from the normal direction of the base member. Each photograph on the right side in FIG. 20 is a cross-sectional photograph taken along the dashed line of the left photograph. Note that in the drawings, a reference sign $1b$ denotes a non-adhesive region.

As illustrated in the drawings, it can be seen that the higher the concentration of the cross-linking agent, the smaller the curvature of the hydrogel layer. In addition, it can be seen that the higher the concentration of the processing agent, the lower the rise of the hydrogel layer.

Note that it is recognized from the cross-sectional photograph that the tubular channel $1x$ is formed by the swell and rise of the hydrogel layer at a position overlapping the non-adhesive region. That is, it can be seen that the size of the tubular channel formed between the hydrogel layer and the base member can be controlled by controlling the concentration of the cross-linking agent when forming the hydrogel layer.

Example 2

Each laminate of Example 2 was obtained in the same manner as in Example 1 with the exception that the width of the band-shaped portion where the adhesive functional group is not formed, i.e., the width of the non-adhesive region was changed to 500 µm, 750 µm, 1000 µm, 1250 µm, and 1500 µm. The concentration of the cross-linking agent was set to 0.1 mol % with respect to the monomer.

Figure 21:
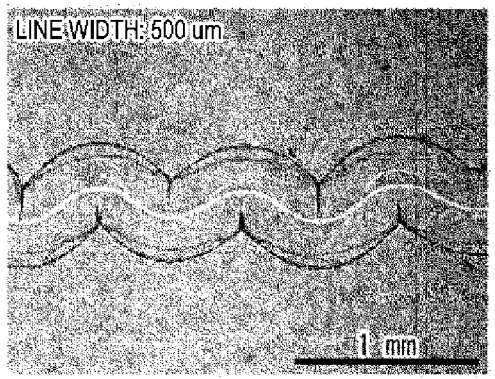
FIG. 21 is photographs of each laminate of Example 2.
Figure 21:
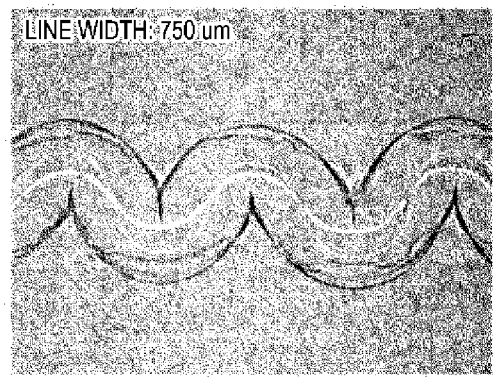
Figure 21:
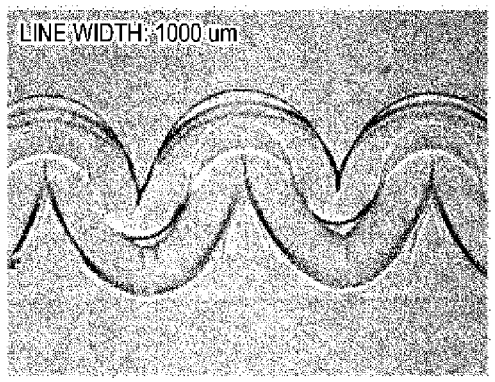
Figure 21:
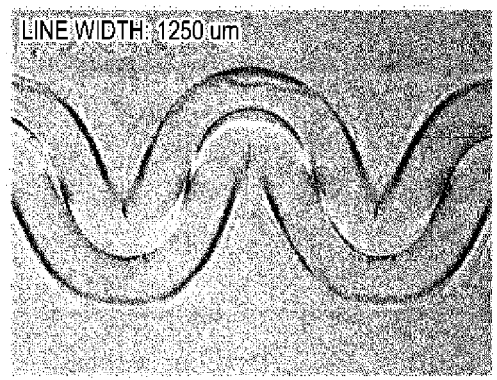
Figure 21:
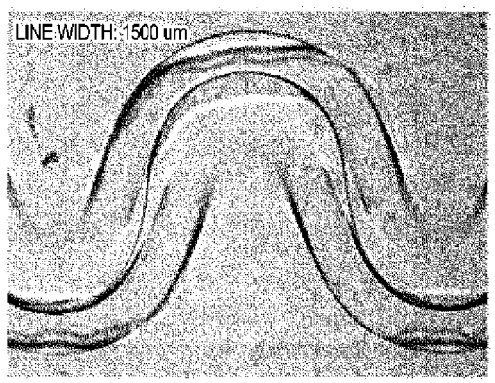

FIG. 21 is a photograph of each laminate of Example 2. As illustrated in the drawing, it can be seen that the narrower the width of the non-adhesive region, the smaller the curvature of the hydrogel layer, whereas the wider the width of the non-adhesive region, the greater the curvature of the hydrogel layer. It can be seen that the size of the tubular channel formed between the hydrogel layer and the base member can be controlled by controlling the width of the non-adhesive region.

Example 3

A laminate of Example 3 was obtained in the same manner as in Example 1 with the exception that acrylamide and acrylic acid were used in combination as monomers contained in the monomer solution. The concentration of the cross-linking agent was set to 0.1 mol % with respect to the monomer. In the used monomer solution, the concentration of acrylamide was 3.8 mol/L, the concentration of acrylic acid was 0.2 mol/L, and the concentration of the photopolymerization initiator was 0.1 mol % with respect to the monomer.

The obtained hydrogel layer is a layer formed of a stimuli-responsive hydrogel that responds to a pH change.

Figure 22:
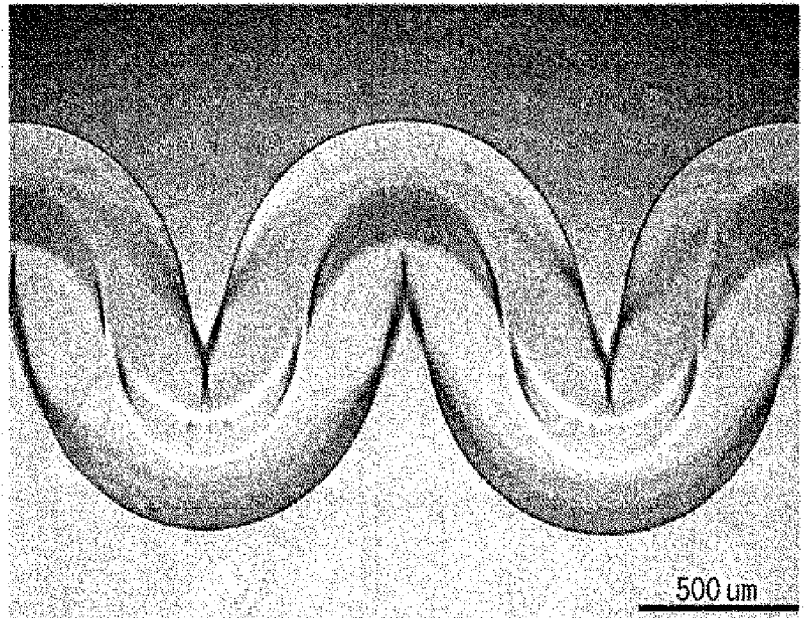
FIG. 22 is photographs of a laminate of Example 3.
Figure 22:
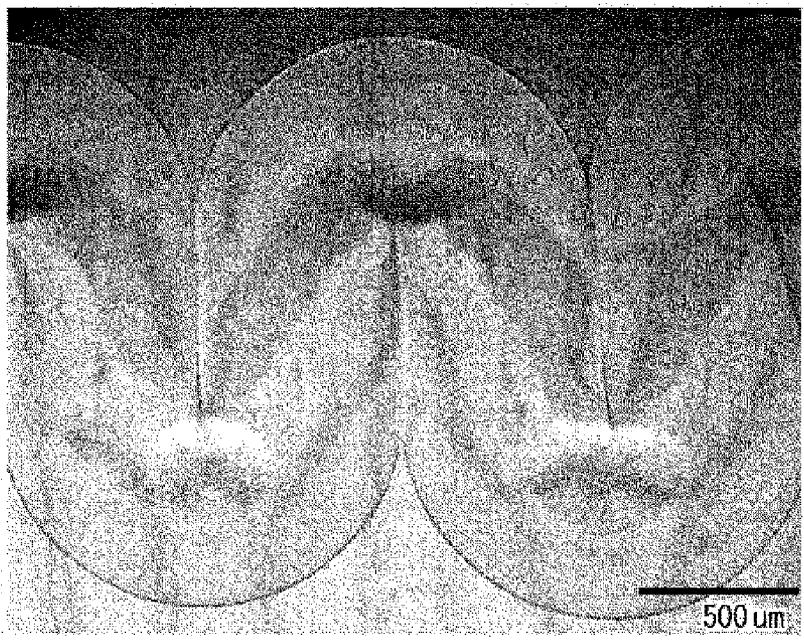

FIG. 22 is a photograph of the laminate of Example 3. As illustrated in the drawing, it can be seen that the curvature of the hydrogel layer swollen with an NaOH aqueous solution is greater than that of the hydrogel layer swollen with pure water.

In addition, it was confirmed that the curvature of the hydrogel layer is reduced when the laminate including the hydrogel layer swollen with an NaOH aqueous solution is again immersed in pure water. That is, in the laminate of Example 3, the degree of the curvature of the hydrogel layer reversibly changed in accordance with the change in pH.

In the laminate of Example 3, it can be seen that the size of the tubular channel formed between the hydrogel layer and the base member can be controlled by controlling the pH of the hydrogel layer.

Example 4

A laminate of Example 4 was obtained in the same manner as in Example 1 with the exception that isopropyl acrylamide was used in place of acrylamide as the monomer contained in the monomer solution and the monomer solution was a dimethyl sulfoxide solution. The concentration of the cross-linking agent was set to 0.1 mol % with respect to the monomer. The obtained hydrogel layer is a layer formed of a stimuli-responsive hydrogel that responds to a change in temperature.

Figure 23:
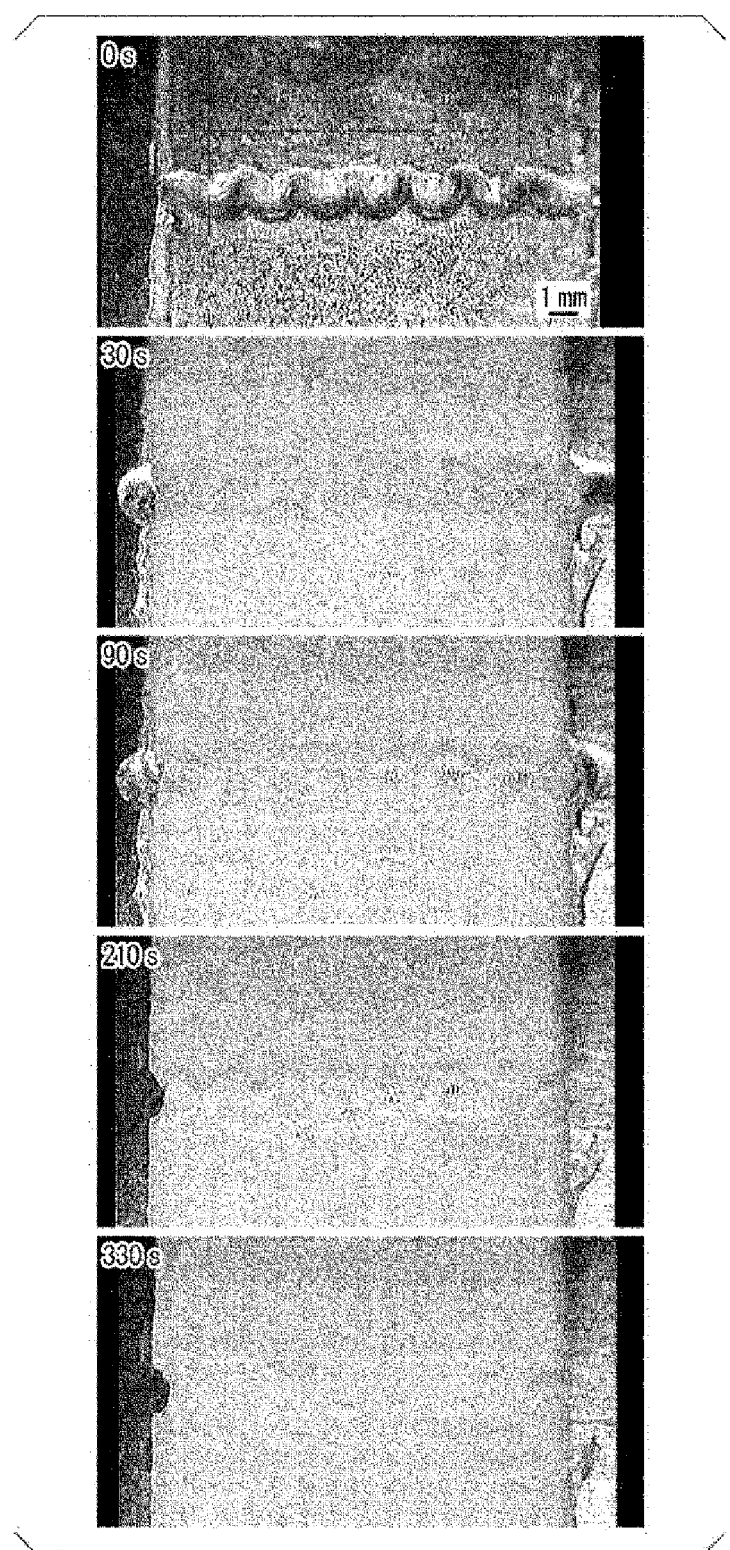
FIG. 23 is photographs showing a change of a laminate of Example 4 upon heating.

FIG. 23 is photographs showing a change upon heating of the laminate of Example 4. Specifically, FIG. 23 is photographs showing states of 30 seconds, 90 seconds, 210 seconds and 330 seconds after 0 second (0 s) set as the start of heating of the laminate.

As shown in FIG. 23, when the laminate was stationarily placed on a hot plate heated to 60° C., the polyisopropylacrylamide was heated to cause a phase change, and shrinkage occurred while releasing water. As a result, the shape dynamically changed from the three-dimensional shape having the curved tubular channel to the planar shape.

Figure 24:
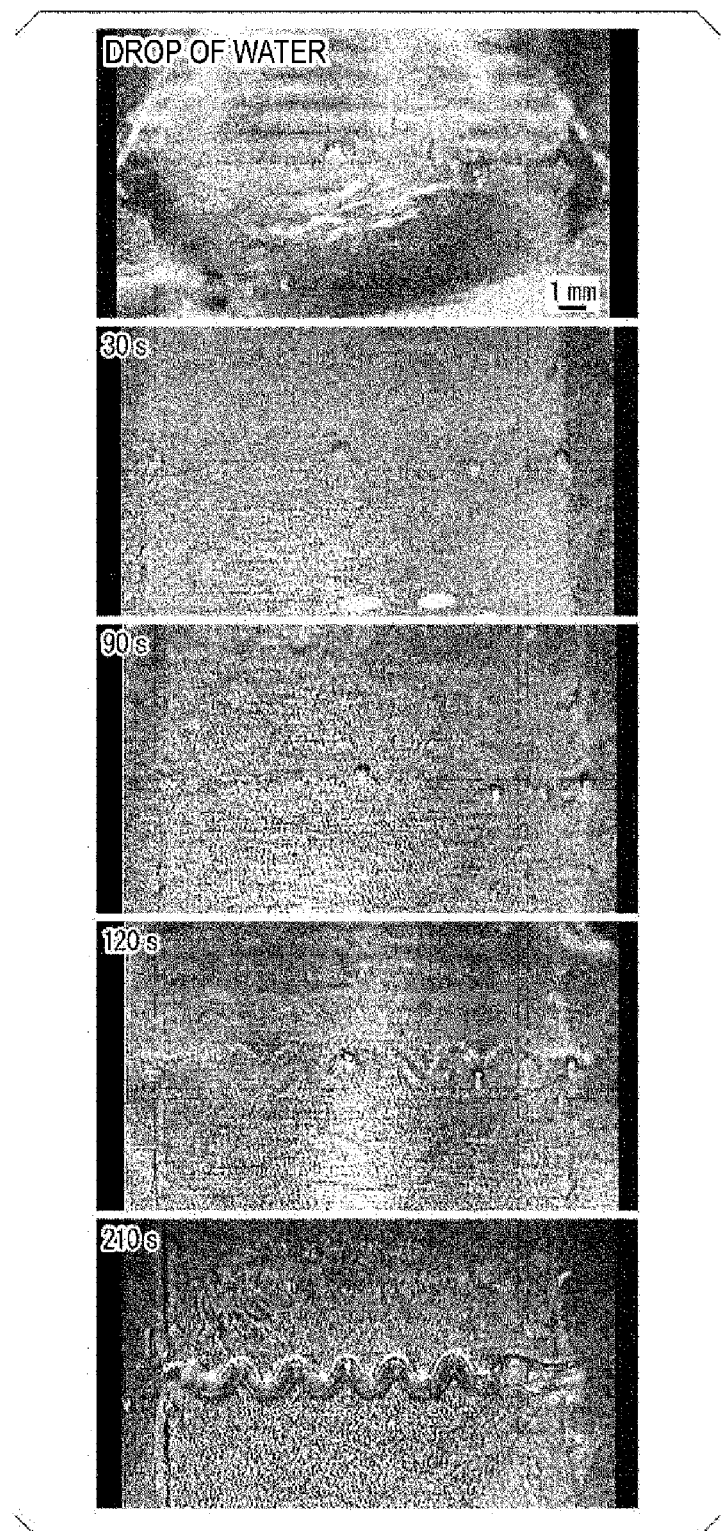
FIG. 24 is photographs showing a change of the laminate upon cooling after heating for 330 seconds in FIG. 23.

FIG. 24 is photographs showing a change of the laminate upon cooling after the heating for 330 seconds in FIG. 23. Specifically, FIG. 24 is photographs showing states of 30 seconds, 60 seconds, 120 seconds and 210 seconds after 0 second (0 s) set as the start of cooling of the laminate. At the start of cooling of the laminate shown in FIG. 24, the laminate is in a heated state at 60° C.

As illustrated in FIG. 24, as a result of cooling of the laminate with a drop of water at 25° C., the hydrogel layer was again swollen and dynamically changed from the planar shape to the three-dimensional shape. In other words, in the laminate of Example 4, the degree of the curvature of the hydrogel layer reversibly changed in accordance with the change in temperature.

It can be seen that in the laminate of Example 4, the size of the tubular channel formed between the hydrogel layer and the base member can be controlled by controlling the temperature of the hydrogel layer.

Example 5

A shape control device was fabricated by attaching a metal pattern having a width of 2 mm composed of an aluminum foil to the back surface side of the base member of the laminate fabricated by the method of Example 4. The metal pattern corresponds to the electrode in the above-described embodiment.

Figure 25:
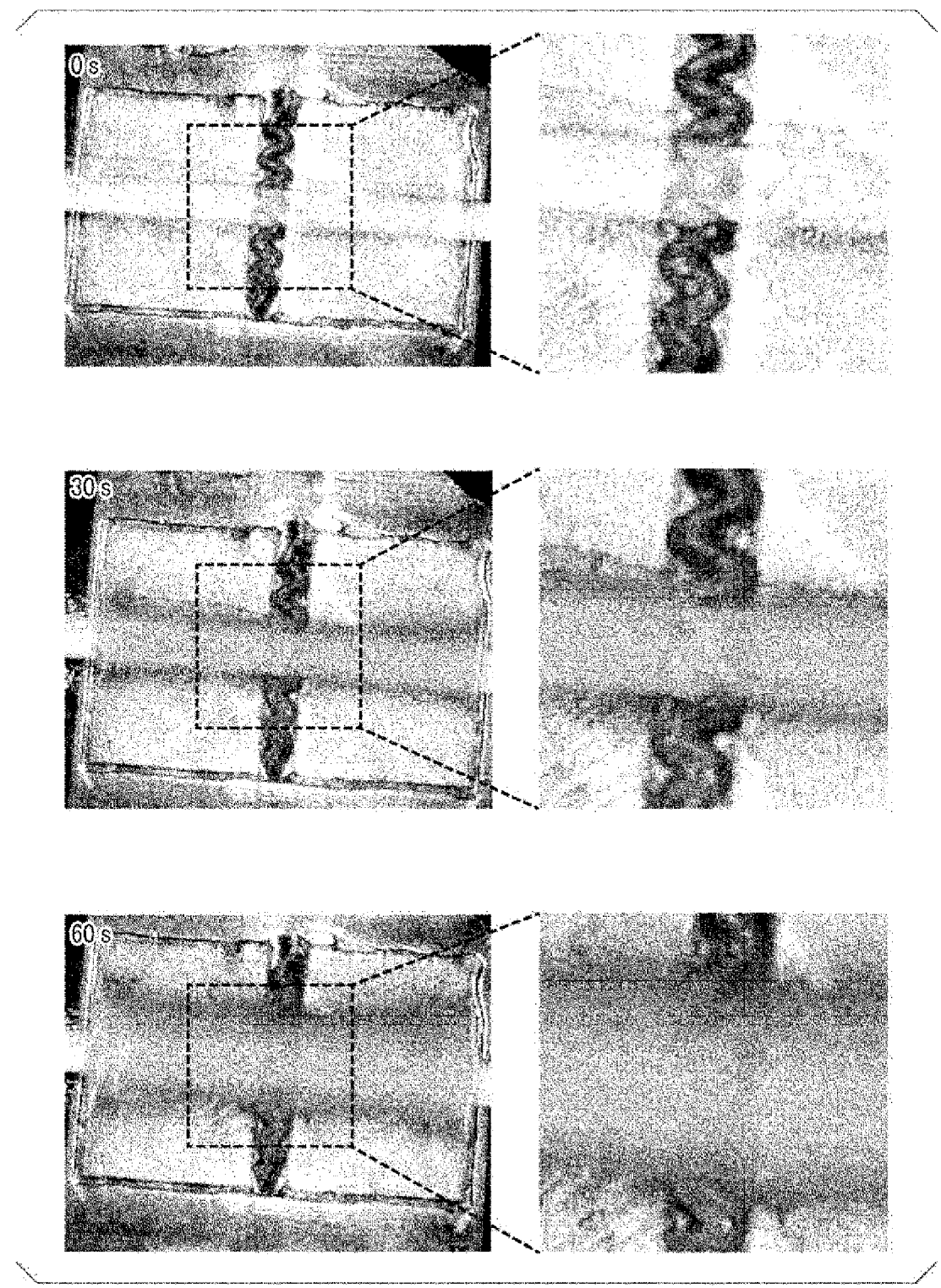
FIG. 25 is photographs and partially magnified photographs thereof showing a change upon heating through energization of an electrode of a shape control device of Example 5.

FIG. 25 is photographs and partially magnified photographs thereof showing a change upon heating through energization of an electrode of a shape control device of Example 5. Specifically, the photographs show states after 30 seconds and after 60 seconds from 0 second (0 s) set as the start of the energization at 10 V and 0.6 A with the power source connected to the electrode.

As illustrated in the drawing, in response to the energization, the electrode generated heat and the temperature at the periphery of the electrode increased. As a result, the hydrogel layer shrunk while releasing water, and the shape dynamically changed from the shape of the three-dimensional channel to the planar shape. It is conceived that the polyisopropylacrylamide constituting the hydrogel layer was heated to cause phase change and the degree of swelling was changed.

In addition, after stopping the energization, the laminate was cooled with a drop of water at 25° C. As a result, the hydrogel layer was again swollen and the shape dynamically changed from the planar shape to the three-dimensional shape. That is, in the laminate provided with the shape control device of embodiment 5, the degree of the curvature of the hydrogel layer reversibly changed in accordance with the change in temperature.

It can be seen that, in the laminate provided in the shape control device of Example 5, the size of the tubular channel formed between the hydrogel layer and the base member can be controlled by controlling the temperature of the hydrogel layer.

Example 6

A laminate was produced by the above-described second producing method.

First, a polydimethylsiloxane sheet as the base member was washed and the surface was completely dried.

The thickness of the used PDMS sheet was 1 mm. The polydimethylsiloxane sheet is hereinafter referred to as "PDMS sheet".

Thereafter, an ethanol solution of benzophenone was dropped to completely cover the surface of the PDMS sheet, and left to stand. Thereafter, the surface of the PDMS sheet was washed and completely dried, and a PDMS sheet with an initiator attached to the surface was obtained. In the following description, the resulting PDMS sheet is referred to as "adhesive PDMS base member".

Next, a paraffin film (product name: Parafilm (registered trademark) with a thickness of 130 μm) having a strip shape with a width of 1 mm was disposed on the surface on which the initiator is attached in the adhesive PDMS base member, and a spacer having a thickness of 500 μm was further disposed, and then, a monomer solution was dripped to the center of the base member. The monomer solution contains acrylamide as a monomer, bisacrylamide as a cross-linking agent, LAP as a photopolymerization initiator, and glucose and glucose oxidase as a deoxidizer.

In the used monomer solution, the concentration of acrylamide was 4.0 mol/L and the concentration of photopolymerization initiator was 0.1 mol % with respect to the monomer. In addition, the monomer solution was a solution, as deoxidizer, containing glucose having a concentration of 4.2 mg/ml and glucose oxidase having a concentration of 0.25 mg/ml.

Next, a glass substrate subjected to an oxygen plasma treatment was placed to cover the monomer solution, and the monomer solution was sandwiched between the adhesive PDMS substrate and the sealing substrate. Here, the glass substrate placed to cover the monomer solution corresponds to the sealing substrate in the above embodiment.

Next, a mercury lamp was used as the light source, and the monomer solution was irradiated with an ultraviolet ray from above the sealing substrate. After the light irradiation, the sealing substrate was removed and the unreacted gel precursor molecules were removed through immersion in a large excess amount of pure water for 24 hours to obtain a laminate of Example 6.

Figure 26:
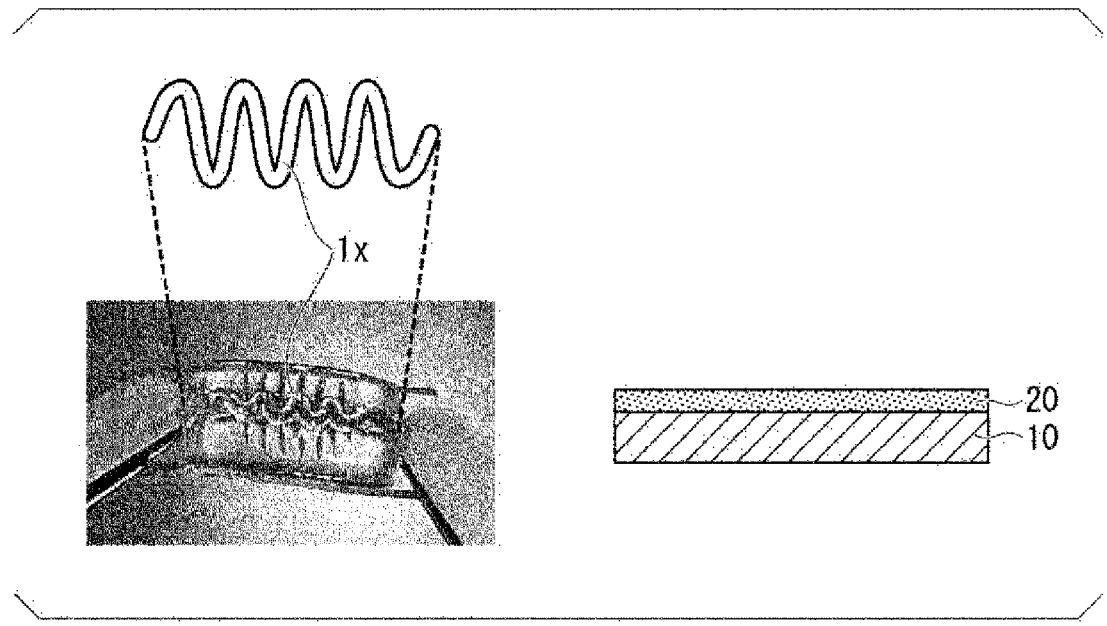
FIG. 26 is a photograph of a laminate of Example 6 and a schematic view illustrating a state of the laminate.
Figure 27:
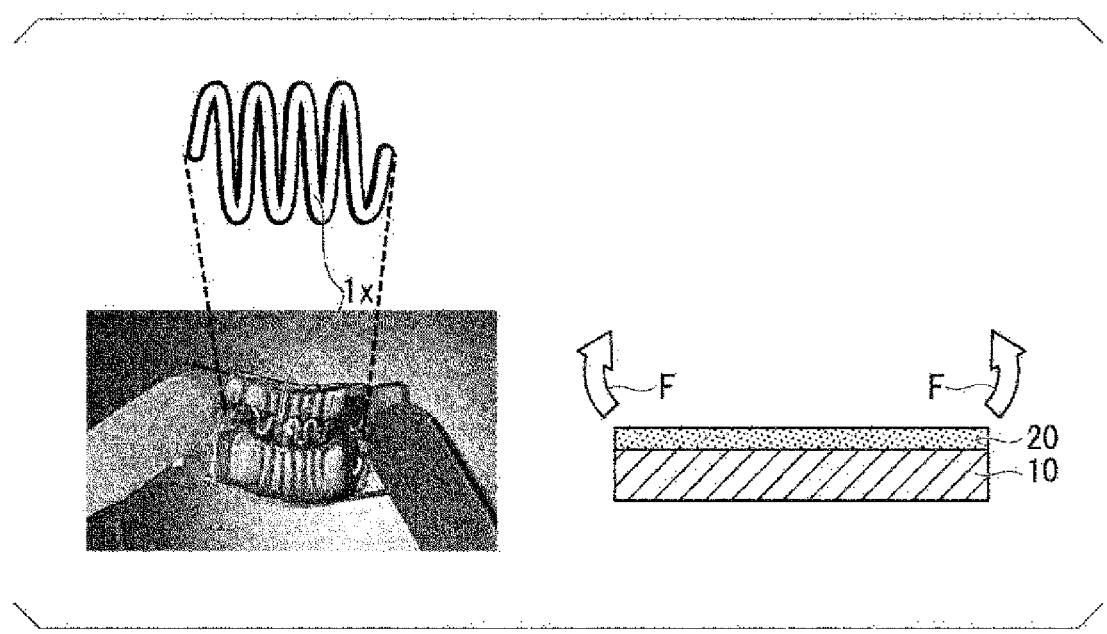
FIG. 27 is a photograph of the laminate of Example 6 and a schematic view illustrating a state of the laminate.
Figure 28:
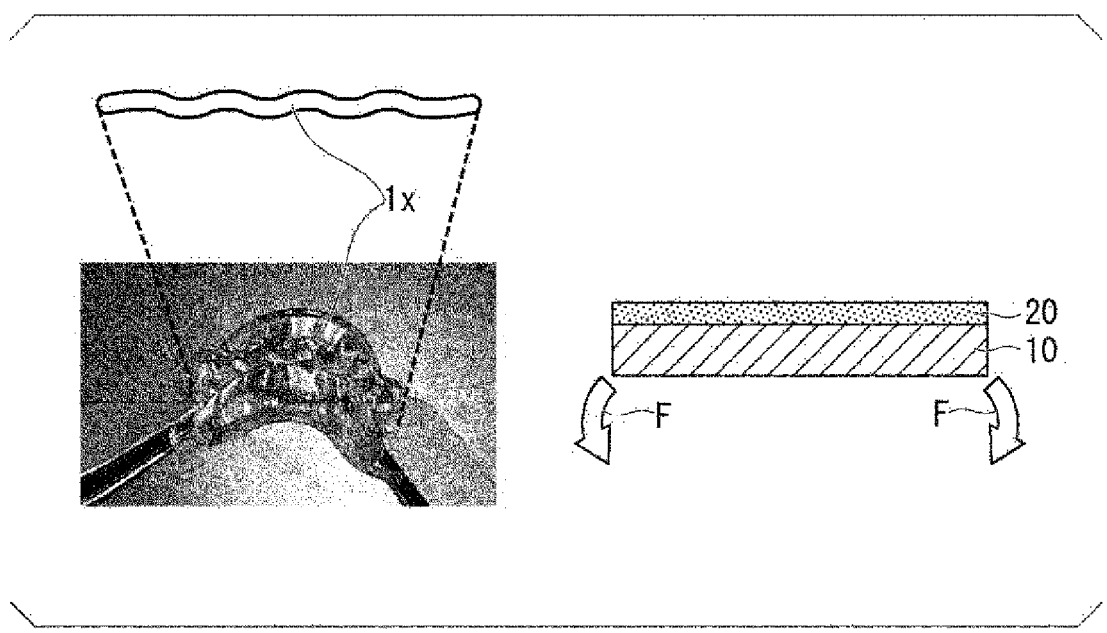
FIG. 28 is a photograph of the laminate of Example 6 and a schematic view illustrating a state of the laminate.

FIGS. 26 to 28 are photographs of the laminate of Example 6 and schematic diagrams illustrating states of the laminate.

First, as illustrated in FIG. 26, the hydrogel layer 20 provided in the laminate of Example 6 includes the channel 1x that meanders along a non-adhesive region formed in the laminate.

In addition, as illustrated in FIG. 27, the entire laminate of Example 6 is curved when the laminate is grasped on both end sides in the extending direction of the non-adhesive region formed in the laminate and a stress F is applied such that the surface where the hydrogel layer 20 is formed protrudes. At this time, a compressive stress was applied to the hydrogel layer 20, and the tubular channel 1x was compressed.

Further, as illustrated in FIG. 28, the entire laminate of Example 6 is curved when the laminate is grasped on both end sides in the extending direction of the non-adhesive region formed in the laminate, and the stress F is applied such that the surface where the hydrogel layer 20 is formed is depressed. At this time, a tensile stress was applied to the hydrogel layer 20, and the tubular channel 1x was elongated.

That is, in the laminate of Example 6, the shape of the hydrogel layer and the shape of the tubular channel formed in the hydrogel layer were reversibly changed in accordance with the stress applied thereto. It can be seen that, in the laminate of Example 6, the size and the shape of the tubular channel formed between the hydrogel layer and the base member can be controlled by controlling the stress applied thereto.

From the foregoing, it was confirmed that the present disclosure is useful.

INDUSTRIAL APPLICABILITY

The laminate according to the present disclosure is useful as a cell culture device and a reaction vessel utilizing the channel shape, and can be widely applied in tissue engineering, chemical engineering, and the like, for example.

REFERENCE SIGNS LIST 1, 1A, 1B, 2, 3 . . . Laminate
1a, 2a, 3a . . . Adhesive region 1b, 2b, 3b . . . Non-adhesive region
10 . . . Base member
10a, 11a . . . First surface
11, 11A . . . Layer of silane coupling agent
30 . . . Layer of photopolymerization initiator
20, 21 . . . Hydrogel layer
20A . . . Monomer solution (Precursor solution)
25 . . . Sheet member
40 . . . Input unit
70a . . . Surface
90 . . . Layer of gel intrusive polymer
100 . . . Shape control device

The invention claimed is:

1. A laminate comprising:
a base member having a first surface including a first adhesive region, a second adhesive region, and a non-adhesive region disposed between the first adhesive region and the second adhesive region; and
a hydrogel layer including a stimuli-responsive hydrogel that is configured to reversibly deform in response to a stimulus, at least a portion of the hydrogel layer contacting the first surface of the base member,
wherein the hydrogel layer is configured to adhere to the base member at the first and second adhesive regions,
wherein the hydrogel layer is configured to be spaced apart from the base member at the non-adhesive region, and
wherein the stimulus is selected from the group consisting of: heat, light, a magnetic field, an electrical current, pH, or combinations thereof.

2. The laminate according to claim 1, wherein
the non-adhesive region is a band shape extending in a first direction parallel to the first surface; and
each of the first and the second adhesive regions extend in the first direction.

3. A shape control device comprising:
the laminate according to claim 1; and
an input unit configured to input the stimulus to the hydrogel layer.

4. The shape control device according to claim 3, wherein the input unit includes an electrode disposed on a second surface of the base member.

5. The shape control device according to claim 3, wherein the base member is a portion of the input unit.

6. The shape control device according to claim 5, wherein the base member is configured to generate heat.

7. The shape control device according to claim 6, wherein the stimulus is heat.

8. The shape control device according to claim 3, wherein the stimulus is heat and the hydrogel layer includes poly (N-isopropylacrylamide), poly (methyl vinyl ether), or combinations thereof.

9. The shape control device according to claim 3, wherein the stimulus is pH and the hydrogel layer includes electrolytes.

10. The shape control device according to claim 3, wherein the stimulus is light and the hydrogel layer includes spiropyran, azobenzene, or combinations thereof.

11. The shape control device according to claim 3, wherein the stimulus is an electrical current and the hydrogel layer includes polypyrrole, polythiophene, polyaniline, or combinations thereof.

12. The laminate according to claim 1, wherein at the non-adhesive region, the hydrogel layer is configured to reversibly deform in a direction perpendicular to the first surface of the base member.

13. The laminate according to claim 12, wherein when the hydrogel layer is deformed, the hydrogel layer and the base member cooperate to define a channel between the hydrogel layer, the base member, the first adhesive region and the second adhesive region.

14. The laminate according to claim 1, wherein the base member includes a polymeric material selected from the group consisting of: polyvinyl chloride, polystyrene, acrylonitrile butadiene styrene resin, polylactic acid, polyimide, phenolic resin, or combinations thereof.

15. The laminate according to claim 1, wherein the base member includes an elastomeric material selected from the group consisting of: polysilicone, synthetic rubber, or combinations thereof.

16. The laminate according to claim 1, wherein the base member includes a material selected from the group consisting of: glass, a conductor, a magnetic metal, a piezoelectric element, and a light-emitting element.

17. A shape control device comprising:
a base member including glass, a surface of the base member including a first adhesive region, a second adhesive region, and a non-adhesive region disposed between the first adhesive region and the second adhesive region, the non-adhesive region defining a band shape extending in a first direction parallel to the surface, and each of the first and second adhesive regions extending in the first direction; and
a hydrogel layer including a hydrogel, the hydrogel layer disposed on the surface of the base member,
wherein in a first position, the hydrogel layer contacts the surface of the base member at the first adhesive region, the second adhesive region, and the non-adhesive region, and
wherein in a second position, the hydrogel layer contacts the surface of the base member at the first adhesive region and the second adhesive region and is spaced apart from the base member at the non-adhesive region, and
wherein in the second position, a channel extends between the hydrogel layer, the surface of the base member, the first adhesive region, and the second adhesive region.

18. The shape control device according to claim 17, wherein the non-adhesive region has a width that is greater than or equal to about 500 micrometers ($\mu$m) to less than or equal to about 1 millimeter (mm).

19. A shape control device comprising:
a base member including glass, the base member including a first adhesive region, a second adhesive region, and a non-adhesive region disposed between the first adhesive region and the second adhesive region;
a hydrogel layer including polyisopropylacrylamide, the hydrogel layer disposed on a surface of the base member; and
an input unit,
wherein the hydrogel layer is configured to adhere to the base member at the first and second adhesive regions and to be spaced apart from the base member at the non-adhesive region,
wherein the hydrogel layer is configured to reversibly deform in response to a stimulus in a direction perpendicular to the surface of the base member at the non-adhesive region, wherein the input unit is configured to input the stimulus to the hydrogel layer, and
wherein the stimulus is heat.

\* \* \* \* \*